(12) United States Patent
Crawford et al.

(10) Patent No.: US 12,079,317 B2
(45) Date of Patent: *Sep. 3, 2024

(54) MODULAR DATA CENTER

(71) Applicant: Vapor IO Inc., Austin, TX (US)

(72) Inventors: Colton Malone Crawford, Austin, TX (US); Steven White, Austin, TX (US); Ben Chavez, Austin, TX (US); Frank Basso, Austin, TX (US)

(73) Assignee: Vapor IO Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,486

(22) Filed: Jun. 5, 2023

(65) Prior Publication Data
US 2024/0028677 A1    Jan. 25, 2024

Related U.S. Application Data

(63) Continuation of application No. 17/316,458, filed on May 10, 2021, now Pat. No. 11,698,951, which is a
(Continued)

(51) Int. Cl.
*G06F 21/31* (2013.01)
*E04H 5/02* (2006.01)
(Continued)

(52) U.S. Cl.
CPC .............. *G06F 21/31* (2013.01); *E04H 5/02* (2013.01); *G05B 19/042* (2013.01); *G06F 21/86* (2013.01);
(Continued)

(58) Field of Classification Search
CPC ......... G06F 21/31; E04H 5/02; H05K 7/1495; H05K 7/1497; H05K 7/1498; H05K 7/183;
(Continued)

(56) References Cited

U.S. PATENT DOCUMENTS 4,258,967 A * 3/1981 Boudreau ............ H05K 7/1421
312/273
4,589,712 A   5/1986 Hastings
(Continued)

FOREIGN PATENT DOCUMENTS

JP         2004045212 A     2/2004
WO    WO-2017054035 A1 *  4/2017  .......... H05K 7/1497

OTHER PUBLICATIONS

Non-Final Office Action for related U.S. Appl. No. 17/082,869 issued Sep. 21, 2023, 152 pages.
(Continued)

*Primary Examiner* — Badri Narayanan Champakesan
(74) *Attorney, Agent, or Firm* — Pillsbury Winthrop Shaw Pittman, LLP

(57) ABSTRACT

Provided is a rack, comprising: a plurality of rack units; and a plurality of lockers each housing a different respective subset of the rack units, wherein respective lockers among the plurality comprise: a first respective barrier disposed between a respective pair of the rack units; a second respective barrier disposed between another respective pair of the rack units; a third respective barrier that is orthogonal to the first barrier and the second barrier, the third respective barrier being moveably or removably coupled to the rack; a respective volume configured to receive one or more computing devices; and a respective lock configured to secure the third respective barrier to the rack in the closed position when in a locked state.

22 Claims, 17 Drawing Sheets

Related U.S. Application Data continuation of application No. 16/209,961, filed on Dec. 4, 2018, now Pat. No. 11,030,285.

(60) Provisional application No. 62/594,221, filed on Dec. 4, 2017.

(51) Int. Cl.
| | |
|---|---|
| G05B 19/042 | (2006.01) |
| G06F 21/86 | (2013.01) |
| H05K 7/14 | (2006.01) |
| H05K 7/18 | (2006.01) |
| H05K 7/20 | (2006.01) |
| A62C 37/40 | (2006.01) |
| E05B 47/00 | (2006.01) |
| H02S 20/22 | (2014.01) |

(52) U.S. Cl.
CPC ......... *H05K 7/1495* (2013.01); *H05K 7/1497* (2013.01); *H05K 7/1498* (2013.01); *H05K 7/18* (2013.01); *H05K 7/183* (2013.01); *H05K 7/20209* (2013.01); *H05K 7/20745* (2013.01); *H05K 7/2079* (2013.01); *H05K 7/20836* (2013.01); *A62C 37/40* (2013.01); *E05B 47/0002* (2013.01); *G05B 2219/2614* (2013.01); *G05B 2219/2639* (2013.01); *H02S 20/22* (2014.12)

(58) Field of Classification Search
CPC ............. H05K 7/20745; H05K 7/2079; H05K 7/20836
USPC .......................................................... 726/19
See application file for complete search history.

(56) References Cited

U.S. PATENT DOCUMENTS

| | | | | |
|---|---|---|---|---|
| 4,758,924 | A * | 7/1988 | Dillon | H05K 7/20554 361/752 |
| 5,778,696 | A | 7/1998 | Conner | |
| 6,859,366 | B2 * | 2/2005 | Fink | E04H 5/02 62/414 |
| 7,660,116 | B2 * | 2/2010 | Claassen | G06F 1/20 165/80.4 |
| 8,201,266 | B2 * | 6/2012 | Campbell | G08B 13/189 414/790 |
| 8,675,357 | B2 * | 3/2014 | Namek | H05K 7/20745 361/692 |
| 8,677,365 | B2 | 3/2014 | Bash et al. | |
| 8,762,522 | B2 * | 6/2014 | Moon | G06F 9/5094 709/224 |
| 8,842,433 | B2 | 9/2014 | Koblenz et al. | |
| 8,854,822 | B2 * | 10/2014 | Hazzard | H05K 7/1498 361/725 |
| 8,917,502 | B1 * | 12/2014 | Gardner | H05K 7/1497 361/679.5 |
| 9,072,193 | B1 * | 6/2015 | Eichelberg | A47B 96/04 |
| 9,232,669 | B2 * | 1/2016 | Love, II | H05K 7/1488 |
| 9,273,492 | B2 * | 3/2016 | Gokcebay | E05C 3/042 |
| 9,394,723 | B1 * | 7/2016 | Roth | E05B 27/0057 |
| 9,471,350 | B2 * | 10/2016 | Pavlas | G06F 9/45558 |
| 9,506,821 | B1 | 11/2016 | Robillard et al. | |
| 9,521,787 | B2 | 12/2016 | Chainer et al. | |
| 10,098,248 | B1 * | 10/2018 | Klinger | H05K 7/1495 |
| 10,426,056 | B1 * | 9/2019 | McNair | E04B 1/34384 |
| 10,609,837 | B2 * | 3/2020 | Naor | H05K 7/20745 |
| 2002/0199120 | A1 * | 12/2002 | Schmidt | H04L 12/2856 709/224 |
| 2006/0031447 | A1 * | 2/2006 | Holt | H04L 63/0428 709/223 |
| 2006/0036386 | A1 | 2/2006 | Cupples et al. | |
| 2007/0260417 | A1 | 11/2007 | Starmer et al. | |
| 2009/0229194 | A1 * | 9/2009 | Armillas | H05K 7/1497 211/162 |
| 2011/0107332 | A1 | 5/2011 | Bash | |
| 2012/0031633 | A1 | 2/2012 | Su et al. | |
| 2012/0155027 | A1 * | 6/2012 | Broome | H05K 7/2039 361/688 |
| 2013/0086404 | A1 | 4/2013 | Sankar et al. | |
| 2013/0185436 | A1 * | 7/2013 | Carlin | G06F 9/5011 709/226 |
| 2014/0085812 | A1 * | 3/2014 | Ehlen | H05K 7/20563 361/679.49 |
| 2014/0175030 | A1 * | 6/2014 | Lu | H05K 7/1488 211/26 |
| 2014/0185225 | A1 * | 7/2014 | Wineland | H05K 7/20745 361/679.31 |
| 2014/0298734 | A1 * | 10/2014 | Rogers | H05K 7/1497 52/79.9 |
| 2014/0345207 | A1 | 11/2014 | Gliessman | |
| 2016/0105994 | A1 * | 4/2016 | Hwang | H05K 7/20745 361/695 |
| 2016/0157388 | A1 | 6/2016 | Belady et al. | |
| 2016/0266632 | A1 | 9/2016 | Crawford | |
| 2016/0357993 | A1 | 12/2016 | Claes et al. | |
| 2017/0127574 | A1 | 5/2017 | Heim et al. | |
| 2017/0231118 | A1 | 8/2017 | Cader et al. | |
| 2017/0339106 | A1 * | 11/2017 | Rimmer | H04L 12/6418 |
| 2018/0035572 | A1 | 2/2018 | Song et al. | |
| 2018/0058760 | A1 * | 3/2018 | Allen | F26B 9/003 |
| 2018/0324976 | A1 | 11/2018 | Gao et al. | |
| 2019/0171799 | A1 * | 6/2019 | Crawford | G06F 21/31 |

OTHER PUBLICATIONS energycode.pnli.gov, "Heating Equipment Type," Mar. 2017 downloaded from https://energycode.pnl.gov/COMcheckWeb/robohelp/Heating_Equipment_Type.htm, (Year: 2017), 2 pages.

Bopray, Alora, "What Is a Direct Expansion System," May 24, 2023, downloaded from https://todaysnhomeowner.com/hvac/guides/what-is-a-direct-expansion-system/ (Year: 2023), 8 pages.

Final Office Action for related U.S. Appl. No. 17/082,869 issued on Apr. 15, 2024, 50 pages.

* cited by examiner

MODULAR DATA CENTER

CROSS-REFERENCE TO RELATED APPLICATIONS

This patent application is a continuation of U.S. patent application Ser. No. 17/316,458, filed 10 May 2021, titled SELECTIVE-ACCESS DATA-CENTER RACKS, which is a continuation of U.S. patent application Ser. No. 16/209,961, filed 4 Dec. 2018, titled SELECTIVE-ACCESS DATA-CENTER RACKS, now issued as U.S. Pat. No. 11,030,285, which claims the benefit of U.S. Provisional Patent Application 62/594,221, filed 4 Dec. 2017, titled MODULAR DATA CENTER. The entire content of each afore-mentioned patent filing is hereby incorporated by reference.

BACKGROUND

1. Field

The present disclosure relates generally to data centers and, more specifically, to selective-access data center racks in modular data centers and other data centers.

2. Description of the Related Art

In recent years, industry and consumers have come to increasingly rely upon data centers for computing services. These facilities generally aggregate relatively large amounts of computing power and include relatively complex infrastructure providing network connections, power distribution, and thermal management for the computing devices within the facility. A trend in recent years has been towards ever greater consolidation of computing power in fewer, larger data centers. By way of example, in some architectures, between one and five data centers may serve all of North America, with each data center having thousands or tens of thousands of computing devices, such as rack-mounted servers.

SUMMARY

The following is a non-exhaustive listing of some aspects of the present techniques. These and other aspects are described in the following disclosure.

Some aspects include an apparatus, including: a rack assembly comprising a plurality of racks coupled to one another, wherein: respective racks among the plurality of racks are configured to hold a plurality of rack-mounted computing devices arrayed in a first direction; the plurality of racks are arrayed in one or more directions orthogonal to the first direction for respective racks, with respective racks positioned side-by-side; a rack-assembly enclosure, wherein: the rack-assembly enclosure is coupled to the rack assembly with: at least one degree of freedom of relative movement between the rack-assembly enclosure and the rack assembly, and fewer than three degrees of freedom of relative movement between the rack-assembly enclosure and the rack assembly; the rack-assembly enclosure comprises a barrier configured to block access to an inaccessible subset of the plurality of racks; the rack-assembly enclosure comprises an opening in the barrier configured to permit access to at least part of an accessible subset of the plurality of racks, the accessible subset and the inaccessible subsets being disjoint sets; the rack assembly and rack-assembly enclosure are configured to determine which of the plurality of racks are in the inaccessible subset and which of the plurality of racks are in the accessible subset responsive to the at least one degree of freedom of relative movement between the rack-assembly enclosure and the rack assembly, such that relative movement of the rack assembly and rack-assembly enclosure selectively provides physical access to a technician to different rack unit portions of the rack assembly; and an actuator mechanically coupled to the rack assembly or the rack-assembly enclosure, the actuator being configured to actuate relative movement between the rack assembly and the rack-assembly enclosure in at least one of the one or more degrees of freedom.

Some aspects include a process, including: receiving, with one or more processors, a command requesting access to a subset of racks in a rack assembly; accessing, with one or more processors, a tenant account among a plurality of tenant accounts of tenants having computing devices in the rack assembly; determining, with one or more processors, based on the tenant account, that the request is authorized; and in response to the determination, moving the rack assembly relative to a rack enclosure with an actuator and thereby changing which of a plurality of racks in the rack assembly are accessible via an opening in an enclosure of the rack assembly.

Some aspects include an apparatus, including: a rack, comprising: a plurality of rack units each configured to receive rack-mounted computing equipment; and a plurality of lockers each housing a different respective subset of the rack units, wherein respective lockers among the plurality comprise: a first respective barrier disposed between a respective pair of the rack units, the first respective barrier being permanently affixed to the rack; a second respective barrier disposed between another respective pair of the rack units, the second respective barrier being permanently affixed to the rack; a third respective barrier that is orthogonal to the first barrier and the second barrier, the third respective barrier being moveably or removeably coupled to the rack; a respective volume configured to receive one or more computing devices mounted in rack units between the first respective barrier and the second respective barrier and behind a closed position of the third respective barrier; and a respective lock configured to secure the third respective barrier to the rack in the closed position when in a locked state and permit movement of the third respective barrier when in an unlocked state from the closed position to an open position, thereby providing access to the respective volume.

Some aspects include an apparatus comprising: a housing configured to shield a datacenter from weather, the housing comprising: a first volume; a rack disposed at least partially disposed in the first volume and configured to hold rack-mounted computing devices; an actuator mechanically coupled to the rack and configured to drive movement of the rack and rack-mounted computing devices mounted to the rack, wherein a range of actuator-driven movement of the rack is substantially within the first volume; an access-control vestibule configured to be occupied by a technician servicing the rack-mounted computing equipment and provide access to the rack-mounted computing equipment, the access-control vestibule being accessible via a door of the housing and having an opening by which the first volume is accessible; and a safety interlock configured to selectively prevent the actuator from driving movement of the rack in response to a signal indicative of whether a person in the access-control vestibule could be contacted by movement of the rack.

Some aspects include a process, including: providing power, cooling, network connections, and shelter to a plurality of rack-mounted computing devices mounted to a rack assembly; receiving a request to drive movement of the rack assembly from a first position or orientation to a second position or orientation, wherein: the first position or orientation exposes a first subset of computing devices mounted to the rack assembly for service by a technician; the first position or orientation blocks a second subset of computing devices mounted to the rack assembly from access by a technician; the second position or orientation exposes the second subset of computing devices mounted to the rack assembly for service by a technician; and the second position or orientation blocks the first subset of computing devices mounted to the rack assembly from access by a technician; determining that a person is not in a position to touch the rack assembly; and in response to the determination and the request, driving movement of the rack assembly from the first position or orientation to the second position or orientation.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
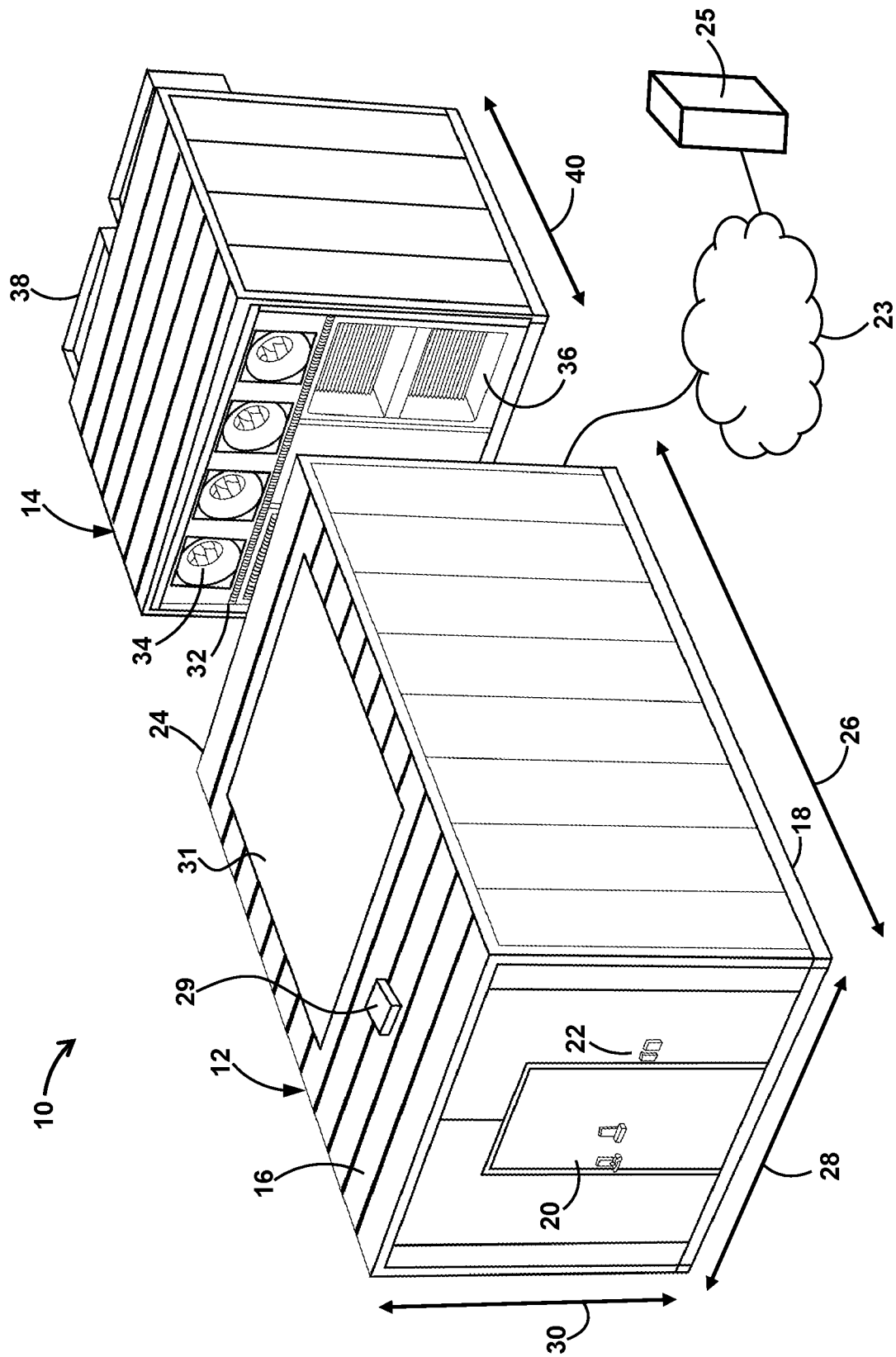
FIG. 1 is an exploded perspective view of a modular data center in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of data center design. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The above-described traditional architectures for data centers are often not well-suited for certain use cases that the inventors expect to become more prominent in the future. Indeed, the inventors expect we will observe an emerging class of applications—including Internet of things, virtual and augmented reality, and mobile apps—where centralized data centers are sub-optimal or will not work because compute, storage, and network capacity need to be near the application or device. This need for lower latency computing at the edge of the network results in a need for micro data centers located at the edge of the network, such as at the base of cellular towers, in basements, or on urban rooftops.

Indeed, traditional data centers often impose high latency. As noted, it is common with traditional data center design for a single facility to serve a relatively large geographic area. Conventional wisdom has been that concentrating resources into a single facility will yield efficiencies at scale and reduce costs. However, a trade-off is that often the data center is relatively far geographically from computing devices accessing services hosted at that data center, such as client computing devices operated by users accessing remotely hosted web applications. Some of these delays are attributable to the underlying physics of network communications, in which messages cannot travel faster than the speed of light. Additional delays are often due to congestion over networks and a number of nodes over which messages are routed, often through multiple hops. Thus, traditional data centers are often relatively high-latency for certain use cases for some users. These delays are expected to become more problematic with the advent of technologies such as artificial intelligence. For some artificial intelligence applications, the time taken to offload data to a train model executing in the cloud and then receive results has a relatively short latency budget. For example, self-driving cars or autonomous drones will need to classify objects in image data within less than 10 to 100 ms, and a substantial portion of this budget can be consumed ferrying data back and forth to a model hosted in a traditional, remote data center that could be thousands of miles away. None of this is to suggest that traditional data center designs are disclaimed in all embodiments. The present techniques may be used to augment traditional data centers, for example, by adding capacity or creating greater power density and more efficient use of the space, and some of the present techniques may be deployed within traditional data centers.

Further, traditional data centers are often not well-suited for relatively rapidly adding additional capacity to the data center. Traditional designs are often implemented with relatively large buildings they can take years to construct and plan, so once a given building is fully populated, there can be a substantial delay before an additional building and computing resources can be brought online. These delays can be particularly problematic when unexpected demand for computing resources arises, for example upon failure of another facility, or upon a consumer of computing resources undergoing exponential growth unexpectedly.

In some embodiments, some, and in some cases all, of the above-described issues with traditional data centers may be mitigated with embodiments of a modular data center described below. Some of these modular data centers are suitable for being transported on a truck to an edge data center site for deployment. Some of these modular data centers are suitable for being constructed (e.g., assembled into a weather-proof or resistant shell) at a factory before being transported to the edge data center site, with the modular data center including infrastructure that protects computing devices from weather, provides environmental controls, rejects heat from computing devices, and provides power to computing devices within the modular data center. In some embodiments, relatively fine-grained control of amounts of deployed computing resources may be obtained by modulating a number of modular data centers deployed to the site. Further, modular data centers may be deployed in a more geographically dispersed fashion relative to traditional data centers, in some cases with modular data centers deployed relatively close to local users, providing relatively low latency access to computing resources for users distributed over a geographic area. For example, these modular data centers could be deployed at the base of cellular towers, on urban rooftops or in building basements.

It is expected that an increasing amount of use cases for modular data centers are likely to include multitenant applications. In these arrangements, different entities purchase or rent space within a given modular data center and, in some cases, computing devices within that space. For example, a company providing artificial intelligence related computing resources for Internet of things appliances may be assigned to one-third of the space within a given modular data center, a different company providing relatively low latency classification models relevant to a local geographic area for autonomous cars or drones may rent a different third of that given data center, and a third company providing virtual reality related computing services that are bandwidth and latency sensitive may occupy the third portion of that modular data center. Or a variety of other arrangements are envisioned in which different companies are sharing the same remotely deployed modular building and infrastructure to host their computing devices (or applications on datacenter provider computing devices).

One challenge with multitenant use cases is securing the computing devices. Physical access to a computing device can leave that computing device exposed to attacks by malicious actors, e.g., sabotage by competitors. In many cases, different tenants sharing the same modular data center may not trust one another or one another's employees or contractors. This issue is exacerbated by use cases in which the modular data centers are remotely deployed and relatively isolated from one another, leaving the data center unsupervised, unlike a traditional data center where a security guard or guards might oversee an entire facility. Further, installation of security measures (and other aspects of a data center facility) on-site with edge modular data centers is expected to be substantially more expensive, on a cost-per-unit-of-computing basis, than traditional data centers. Some embodiments may mitigate some or all of these issues by installing these aspects in a modular data center at a factory, avoiding the need for skilled tradespeople to travel to disparate sites. The edge module, in some embodiments may have all the security elements self contained, making it much more space efficient for configurations with multiple small tenants in particular. That said, embodiments are not limited to systems that address this problem or provide this benefit, which is not to suggest that any other description is limiting.

Traditional data centers are, in some cases, multi-tenant, but many techniques used to selectively grant physical access for technicians are not suitable for some types of modular data centers. For example, traditional cages used in data centers often occupy a relatively large amount of space, in many cases requiring clearance for doors to swing open and offsets between the rack and the cage itself, along with passages around and between cages. The resulting overhead in physical space within the building is often acceptable in traditional data centers, where increasing the size of the facility can be achieved relatively easily.

In contrast, space is often at a premium in modular data centers, particularly those designed to be transported on trucks to remote deployments. (That said, none of this should be read to indicate that any subject matter is disclaimed, as other techniques described herein may be used in traditional data centers implementing cages.) And real-estate geographically near large collections of end users is often relatively expensive, favoring more compact data center facilities.

Some embodiments may mitigate these issues with a modular data center described below that provides relatively fine-grained physical access to hosted computing devices in a space efficient manner. In some embodiments, one or more racks within the modular data center may be configured to move relative to an enclosure that provides selective physical access to a portion of the space in the rack for mounting computing devices. This movement may modulate which portions of the rack are accessible to a technician physically present at the modular data center, preventing physical access (e.g., the ability to touch) by that technician to portions of the rack that the technician is not authorized to access. In some embodiments, before a technician is granted physical access to an interior of the modular data center, the rack and rack enclosure within the data center may move relative to one another to selectively expose only those portions of the rack that the technician is authorized to access, which may be ascertained in some embodiments based upon credentials presented by the technician to a user interface on an exterior of the modular data center. In some cases, the modular data center may be referred to as a micro-datacenter, which in some cases, may be assembled into a larger aggregate datacenter, such as a hyperscale datacenter.

Even finer-grained control of physical access may be provided by some embodiments. In some expected use cases, a given modular data center may include a relatively large number of tenant computing devices, and relatively fine-ingrained control of physical access to those computing devices may need to be maintained. In these use cases, some embodiments may instead or additionally implement an array of lockers (or other access barriers, like with removable or slideable, lockable panels) within a rack that secure subsets of space within the rack from one another, so that a technician with access to, for example, the bottom quarter of a rack, does not necessarily have access to the other portions of that rack. In some cases, locker doors may impose a substantially smaller space overhead for clearance to move the door than cages used in traditional data centers. Further, some embodiments may benefit from a combination of these access barriers and relative movement of the rack and rack enclosure, such that the same space for clearance allowing movement of the locker doors may be reused for each rack in a rack assembly by aligning a rack in the rack assembly through movement with the designated space where clearance is provided for the door to be opened. Such movement also is expected to allow for re-use of the same space for technicians to stand when accessing different computing devices in different racks. The access barriers may be applied in systems in which the rack assembly does not move, which is not to suggest that any other feature is required in all embodiments.

The inventors expect that it will be desirable to avoid physical contact between a technician and the rack or rack enclosure when relative movement (e.g., one or the other is moving or both are moving in different ways) is occurring. To this end, some embodiments may include one or more safety interlocks described below. In some cases, these interlocks may selectively engage or disengage an actuator by which movement is driven responsive to a signal indicative of a position of a technician within the modular data center. Further, some embodiments may include a supplemental door that blocks access by a technician to the rack were rack assembly during movement, in a manner similar to that implemented often with elevator doors. The interlocks may be applied in systems in which the rack assembly does not move, e.g., to guard against other actuators, which is not to suggest that any other feature is required in all embodiments.

Further, the inventors expect that it will be desirable to avoid cramping and tangling of cables, like power, cooling fluid conduit, and networking cables, connected to a rack undergoing movement. To this end, some embodiments may include a cable management device coupled to the rack, as described in greater detail below, that guides these cables into predetermined positions responsive to movement of the rack and constrains amounts of bending stress (and resulting strain) applied to the cables.

Some embodiments may further include structures that define and drive fluid flow in a relatively space efficient and relatively thermally efficient fashion to remove heat from the computing devices in a rack. In some cases, fluid flow may be directed in a manner that shields cabling from heat being rejected from the computing devices, while permitting movement of the rack and avoiding negative pressure scenarios in which exhaust heat is pulled back over computing devices and a portion of the rack, as described in greater detail below.

Further, in many traditional data centers, there is a relatively impermeable separation of concerns between management of the facility and management of the computing devices operating within that facility. Often, environmental parameters of the facility, like temperature, cooling fluid flow, and the like, are managed to serve a lowest common denominator set of computing devices within the facility, for example, over cooling those computing devices experiencing lower loads to adequately cool those devices experiencing the highest load. Further, the allocation of work among computing devices within data centers is often done without regard to the environmental parameters of those data centers due to the separation of concerns. As a result, energy is often wasted, computations are often executed in suboptimal environments, and complexity is amplified for those seeking to manage data centers.

Some embodiments may mitigate these issues with an integrated building and rack management system controller, such as a facility controller described below, that controls the environmental parameters of the facility at the automated request of the infrastructure of a rack of computing devices, and in some cases controls those computing devices responsive to the environmental parameters. Again, not all embodiments provide these benefits, as multiple independently useful techniques are described, and those techniques may be deployed independently of one another, which is not to suggest that any other description herein is limiting.

FIG. 1 is a perspective exploded view of a modular data center 10 in accordance with some of the above-describe techniques. In some embodiments, the data center 10 may include two modules, a compute module 12 and a cooling module 14. In some embodiments, the compute module 12 may house computing equipment of the data center, for example, in accordance with the layout described below with reference to FIG. 2, and including the rack assembly described below with reference to FIG. 3. In some embodiments, the cooling module 14 may house cooling equipment that circulates a cooling fluid over the computing up equipment in the compute module 12 to remove heat and reject that heat into the environment. In some embodiments, the role of the cooling module 12 may be performed by thermal management infrastructure of a larger data center or shared by a collection of collocated instances of the modules 12.

In some embodiments, the compute module 12 and the cooling module 14 may be standardized modules configured to interface with different instances of one another. For example, the compute module 12 may be configured to interface with a plurality of different types of cooling modules. In order to fulfill the cooling and efficiency requirements for customers located around the world, the IT section (e.g., compute module 12) and cooling module 14 may be physically separated. Various cooling modules 14 may then be attached to a given compute module 14, with a common interface, to provide chilled water, direct expansion or economized cooling technologies. In some cases, the size of the cooling section may vary change depending on the technology used. In some embodiments, the compute module 12 and the cooling module 14 may be joined at a factory and shipped as a fully assembled unit to a site for installation. The relatively space-efficient techniques described herein are expected to permit a single unit with both modules to be transported on a single truck, thereby reducing installation and transport costs. In some embodiments, the compute module and the cooling module 12 and 14 may be transported separately, for example on different trucks to an installation site and assembled at an installation site. In some embodiments, the compute module 12 and the cooling module 14 may each be constructed in a modular building plant and transported fully assembled to a data center site, where the two modules 12 and 14 may be joined. In some cases, each may have an arrangement of roof-top crane mounts (e.g., in each corner and in the middle of the longest side) to facilitate loading and unloading from a truck (e.g., on a trailer with a width of 8 feet six inches or less (or 15 feet or less)).

In some embodiments, the compute module 12 includes an exterior shell 16 that protects the interior of the compute module 12 from the weather (e.g., upon being joined with a cooling module 14 to close one side), for example, providing a waterproof or water-resistant interior that prevents rain from reaching the computing equipment and provides insulation, for example with an R value of greater than R15 for exterior walls (or greater than R10) and R30 for the roof (or greater than R20). In some embodiments, the exterior shell 16 may be constructed from sheet-metal coupled (e.g., with spot welds, rivets, screws, or bolts) to a frame made from metal square or rectangular beams including beams in each of the corners.

In some embodiments, the shell may rest on a chassis 18. In some embodiments, the chassis may include welded metal beams that provide a dimensionally stable surface for the compute module 12 during transport and installation. In some cases, the compute module 12 may be configured to be installed on blocks are on a concrete slab placed underneath the chassis 18.

In some embodiments, the compute module 12 may further include a door 20 and a security user interface 22 configured to selectively unlock the door 20 upon presentation of the appropriate credentials. In some embodiments, a facility control module described below may be coupled communicatively to the security user interface 22 (e.g., via a local area network) and an actuator of a smart lock of the door 20. In some embodiments, upon a user entering the appropriate credentials into the user interface 22, the facility controller may instruct the smart lock to unlock the door 20, for example, by ceasing to power an electromagnet holding the door 20 closed, driving a solenoid that removes a pin inserted into the door 20 from the frame of the shell 16, or the like.

The security user interface 22 may take a variety of different forms. Examples include a touch sensitive display screen configured to present a user interface from the facility controller by which a user may type in a credential, such as a pin code, password, swipe pattern, or the like. In some embodiments, the security user interface 22 may include a biometric sensor, such as a fingerprint scanner, a depth sensing camera and infrared camera configured to sense the topography of a user's face for facial recognition, an iris scanner, a retina scanner, or the like. In some embodiments, the facility controller may communicate via the Internet 23 to a remote application 25, which may be configured to compare sensed biometric attributes with those stored in memory (e.g., in tenant account user profiles) to ascertain whether a user supplying biometric attributes (or other credentials) is authorized to enter the compute module 12. In some embodiments, the security user interface 22 may include a wireless transceiver, such as a near field communication (NFC) transceiver or a Bluetooth™ transceiver, and a technician may present a code to the user interface with a physical token, such as a NFC card or Bluetooth™ dongle carried by the user that transmits a unique identifier to the transceiver of the security user interface 22. This value, or value indicative of the supplied value, such as a cryptographic hash code, may be compared by the facility controller or the remote application 25 in communication with the facility controller, to a credential stored in memory in association with the tenant's user account, and embodiments may determine whether to unlock the door 20 responsive to whether the supplied credentials match those stored in the user account. In other embodiments, the security user interface 22 may include (or be) a traditional mechanical lock accessed with the key.

In some embodiments, the compute module 12 may include an interface 24 configured to mate with the cooling module 14. In some cases, the interface 24 may include resilient gaskets and an array of apertures (e.g., welded steel tabs with bolt holes coupled to a frame) by which the cooling module 14 may be bolted and sealed against the compute module 12. Embodiments may further include flashing that overlaps a joint between the modules to deflect water.

In some embodiments, the dimensions of the compute module 12 may be selected such that the compute module 12 can be transported on public highways, for example, in fully assembled form (e.g., with or without the racks described below), for installation upon being built at a factory. In some embodiments, the compute module 12 may have a length 26, a width 28, and a height 30. The length 26, in some cases, may be between 3 and 15 m, for example, between 5 and 10 m. The width 28, in some cases, may be between 2 and 10 m, for example, between 3 and 6 m. In some cases, it is 12.5 feet wide by 19 feet long. The height 30 may be between 1 and 10 m, for example, between 2 and 5 m. In some embodiments, the compute module 12 may have dimensions that are less than or equal to those of a standard shipping container, such as a standard intermodal shipping container, in some cases with crane mounts specified by the corresponding standard. In some embodiments, the compute module 12 may have mechanical couplings, for example, on its roof, configured to interface with cranes for loading and unloading shipping containers. In some cases, the module 12 is a shipping container.

In some embodiments, a roof of the compute module 12 or the cooling module 14 or both may include a drone mount 29, such as a mount for a flying drone powered by batteries and configured to be launched, flown, landed, and charged responsive to remotely received commands, e.g., routed through application 25. In some embodiments, the drone mount 29 is a drone mount for a quad-copter. In some embodiments, the drone mount 29 includes an interface configured to mechanically and removeably couple to a drone, such as an electromagnet configured to selectively bind to a rare earth magnet on a drone, a mechanical latch that can be actuated by a solenoid configured to grasp a member on a drone, or the like. In some embodiments, the drone mount 29 may further include an interface configured to charging a drone, such as exposed electrical contacts configured to mate with resilient corresponding electrical contacts on the base of a drone by which the drone may be charged, or an inductive charger configured to inductively charge a drone mounted to the drone mount 29 without exposing conductors to water or corrosion. In some cases, the compute module 12 may include a wireless area network by which a drone may communicate with a remote pilot, for instance, via the wireless area networks, like a Wi-Fi™ network, and a wired network over the Internet 23. In some embodiments, the drone may include a camera, and a remote pilot may inspect the data center 12 by remotely commanding the drone to take off and fly around the data center 12 capturing imagery of the data center 1110. In some embodiments, the data center 10 may further include exterior lighting and security cameras coupled to power and a network of the data center 10. In some embodiments, the module 12 may include motion sensors configured to emit alarms to the application 25 upon sensing movement.

The compute module 12, the cooling module 14, or both may further include solar panels 31, for example photovoltaic solar panels, which may be coupled to a battery backup system of the data center 10, for example via power conditioning equipment.

In some embodiments, the cooling module 14 is configured to circulate a cooling fluid, such as a cooling liquid or cooling gas, in proximity to (e.g., in contact with heat sinks of) computing equipment in the compute module 12 to carry waste heat away from that computing equipment and back into the cooling module 14, which may be further configured to reject that waste heat back into the environment surrounding the data center 10. In some embodiments, the cooling module 14 may further include an interface 32 configured to mate with the interface 24 of the compute module. The cooling module 14, in some embodiments, may include a plurality of blowers or fans 34 configured to circulate air over the computing equipment and the compute module 12. In some cases, the blowers or fans 34 may create a lower pressure region of air that may draw relatively cool fluid flow from elsewhere in the compute module 12 over the computing equipment. That relatively cool, for example, ambient temperature, air may carry heat away from the computing equipment back up into the fans or blowers 34. Some embodiments may circulate more than 10,000 cubic feet per minute (cfm) of air, e.g., more than 25,000 cfm. Heat exchangers within the cooling module 14, such as refrigeration coils 36 passing through heatsink fins, may cool the air back down again is that air is recirculated back into the interior of the compute module 12 to repeat the cycle and cool the computing equipment. Waste heat from the refrigeration coils may be rejected through external coils 38, for example, having external blowers or fans that circulate ambient air over those coils, thereby rejecting waste heat into the environment. Some embodiments may have chilled water cooling, adiabatic cooling, or direct expansion cooling, e.g., modules for providing both types of cooling may be built and selectively coupled to the compute module 12 depending upon the environment where it is deployed. Some embodiments may provide over 100 kW of cooling, e.g., more than 150 kW.

In some embodiments, the cooling module 14 may have dimensions that are less than or equal to those of the compute module 12, and the cooling module 14 may be constructed from the materials described above with reference to the cooling compute module 12, such that the cooling module 14 may also be assembled in a factory and transported to a data center site on the back of a truck for installation. In some embodiments, the cooling module 14 may have a length 40 that is smaller than the length 26 of the compute module. In some embodiments, the length 40 may be less than or equal to 5 m, 3 m, or 1 m.

Figure 2:
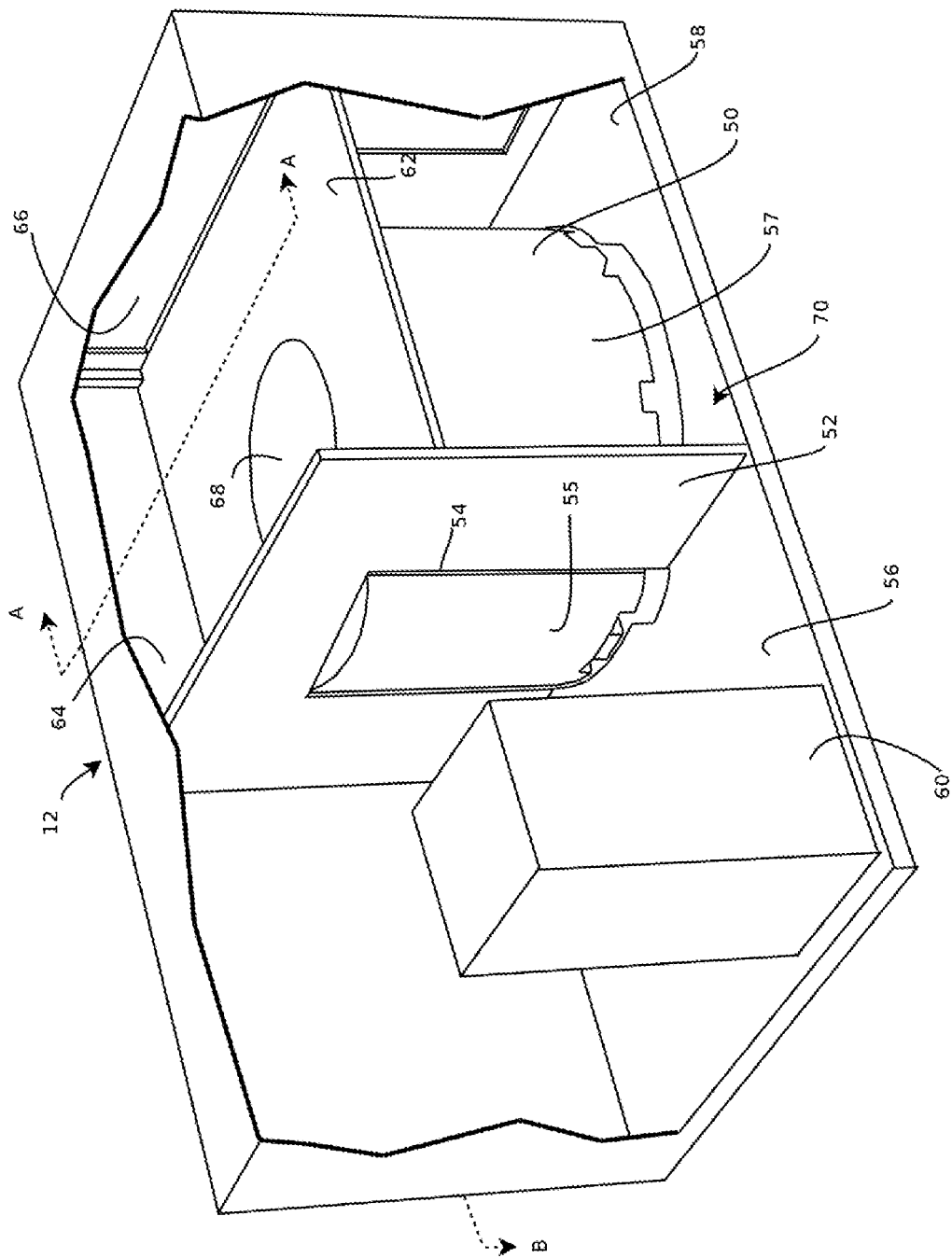
FIG. 2 is a cutaway perspective view of a compute module of the modular data center of FIG. 1 in accordance with some embodiments of the present techniques.

FIG. 2 is a cutaway perspective view of an embodiment of the compute module 12. In some embodiments, the compute module 12 may include a rack assembly 50 configured to move, for example rotate, as described in greater detail below. The rack assembly 50 may be positioned adjacent a wall 52 having an aperture 54 through which a portion of the rack assembly 55 is accessible. The wall 52 may render the rest of the rack assembly 57 inaccessible and, thereby, separate a technician access room 56 (or other type of access-control vestibule) from a rack assembly room 58. The technician access room 56 may further include a backup battery supply 60 electrically coupled to the power system of the compute module 12. The compute module 12 may be configured with cabling, wiring, and plumbing to provide the infrastructure of a data center to the rack assembly 50 and computing equipment in the rack assembly 50. Examples of such infrastructure are described above and include electrical power, networking, and cooling, for example in cooperation with the cooling module 14.

The rack assembly room 58 may further include a false ceiling 62 that separates a plenum 64 from a lower portion of the rack assembly room 58 in which the rack assembly 50 is disposed. The compute module 12 may further include an aperture 66 through which air may flow into the plenum 64 before entering a central chamber 68 of the rack assembly 50 and then flowing out over rack-mounted computing equipment into the room 58 through the rack assembly 50 (carrying away heat in the process). Or in some embodiments, the direction of fluid flow may be reversed. Or in some embodiments, other types of cooling fluids may be used, examples including water, refrigerant, mineral oil, or the like.

As described in greater detail below, the wall 52 and interior surfaces of the room 58 may form a rack assembly enclosure 70 that shields a substantial portion of the rack assembly 50 from physical access by a technician within the technician access room 56. In some embodiments, more than half, more than 70%, more than 80%, or more than 90% of the rack assembly 50 may be shielded from physical access by a technician in the access room 56, with a corresponding remaining portion 55 exposed for physical access. Physical access may include the ability to insert or remove rack-mounted computing equipment into rack unit receptacles described in greater detail below.

Which portion of the rack assembly 50 is available for physical access by a technician in the access room 56 may be adjusted through movement of the rack assembly 50, for example, rotation. Some embodiments, as described in greater detail below, may include an actuator configured to rotate the rack assembly 50 to expose different portions of the rack assembly 50 through the aperture 54 of the wall 52. Or some embodiments may apply a variety of other different types of relative movement between the rack assembly enclosure and the rack assembly to adjust which portions of the rack assembly 50 are accessible, with more examples of each provided below. Due to this movement, an amount of space around the rack assembly in the room 28 may be less than would be needed to position a human to service equipment. In some cases, this space may be less than 1 foot, two feet, or three feet to the nearest wall at the nearest point of the rack assembly 50. Some embodiments may include a aperture 54 designed to change size and position. For instance, some embodiments may include an industrial rolling gate (similar to a garage door or door used to close storefronts) with rails onle each side of the aperture 54 and a rolling actuator (and gate storage space) at one side. The aperture 54 may be contracted by unrolling the industrial gate and sliding the barrier through the rails to partially close off part of the aperture 54 from one side (e.g., top, bottom, left, or right). Some embodiments may include multiple instances of such gates, e.g., one on the top and one on the bottom, or one on the left and one on the right, to adjust both a size and position of the aperture 54 (the aperture 54 in this example being defined in part by one or more distal ends of such partially unrolled gates). In some cases, the size and position may be selected with the techniques described below by which access to lockers or other secure volumes is selectively granted. In some cases, these rolling gates (or the elevator-door style barrier discussed below) may be automatically actuated responsive to a fire suppression system, e.g., to close the aperture 54 before or concurrent with release of a fire suppression chemical to reduce exposure by a human in the vestibule to the chemical. In some embodiments, the rolling gates or sliding doors may be mounted to the rack assembly 50, e.g., with one set over each rack, or they may be mounted to the housing, e.g., to wall 52.

In some embodiments, to access computing equipment within the compute module 12, a technician may first present credentials at the security user interface 22. A facility controller may receive these credentials and compare them to credentials in a tenant user account to ascertain whether the technician is an authorized party to access a given tenant's computing equipment, or send them to application 25 for this determination. In some cases, the credentials may include a tenant identifier by which the profile may be selected and a secret value by which authorization is determined. In some embodiments, the facility controller may communicate with a remote application 25 accessible via the Internet 23 to make this determination, for example, with the remote application being configured to make these determinations for a plurality, such as more than 10, more than 100, or more than 1000 data centers. (In some cases, the data center 10 may provide host computing devices that provide services to user computing devices via the Internet 23.) Upon the remote application or the facility controller determining that the credentials do not match credentials of a tenant having computing equipment within the compute module 12, some embodiments may determine to not unlock the door 20 and may decline access, in some cases providing a message in the security user interface 22 to a user indicating denied access, and in some cases logging the access equipped attempt or emitting an alarm, for example, via text message or email to a different user over the Internet. Such alarms, in some cases, may cause that other user to access security camera footage or activate the drone on the compute module 12 to investigate the situation.

In some embodiments, tenant profiles may further include a list of identifiers of compute modules 12 in which the tenant has computing equipment (e.g. computing equipment they own or lease or otherwise have access to), and in some cases identifiers of physical locations of that computing equipment within the rack 50, such as identifiers of racks in the rack assembly 50 and positions within those racks, like a number of rack units from a bottom or top of the rack. In some cases, locations may be determined with the techniques described in U.S. patent application Ser. No. 15/337,732, titled SENSING LOCATION OF RACK COMPONENTS, filed 28 Oct. 2016, the contents of which are hereby incorporated by reference.

Upon determining that the user supplied credentials match those of a tenant and that the user there is authorized to access a subset of the computing equipment in the rack assembly 50, some embodiments may then actuate movement of the rack assembly 52 expose a portion of the rack assembly 50 that the technician is authorized to access via the aperture 54 and shield via the wall 52 other portions of the rack assembly 50 that the technician is not authorized access, such as computing devices of other tenants. In some cases, after completing movement of the rack assembly 50, some embodiments may then unlock the door 20 with the facility controller, and the technician may enter the access room 56 to physically interacts with the computing equipment.

In some embodiments, to cause the facility controller to adjust which rack units are accessible, the technician may have to leave the room 56 (which may be sensed by the safety interlocks below) and close the door 20 to access a different portion of the rack assembly 50. In some cases, the technician may specify to the facility controller via the security interface 22 before obtaining entry which portions of the rack assembly 50 the user wishes to access, and the process above may be repeated to determine whether the access is authorized, rotate the rack 50, and then provide access. Or in some embodiments, this movement may be executed while the user is within the access room 56. In some embodiments, techniques described below may determine whether the user is safely away from the rack assembly 50 before movement begins, and in some cases whether the user has execute exited the compute module 12 before movement begins. (The discussion of safety related features should not be taken as an admission that the absence of such features is necessarily unsafe.)

In some embodiments, access may be facilitated by rendering computing devices front-access with the techniques described in U.S. patent application Ser. No. 15/065,224, titled PATCH PANEL FOR QSFP+ CABLE, filed 9 Mar. 2016, the contents of which are hereby incorporated by reference. In some cases, accessed computing devices may comply with the Open legacy rack-mountable computing devices and the racks may be compatible with the Open Compute Project Standard, or in some cases, the computing devices and racks may comply with the 19" EIA Standard, which provide examples of rack units that are hereby incorporated by reference as examples consistent with that term. Some embodiments may include adapters like those described in U.S. patent application Ser. No. 15/165,590, titled ADAPTERS FOR RACK-MOUNTED COMPUTING EQUIPMENT, filed 26 May 2016, the contents of which are hereby incorporated by reference.

Figure 3:
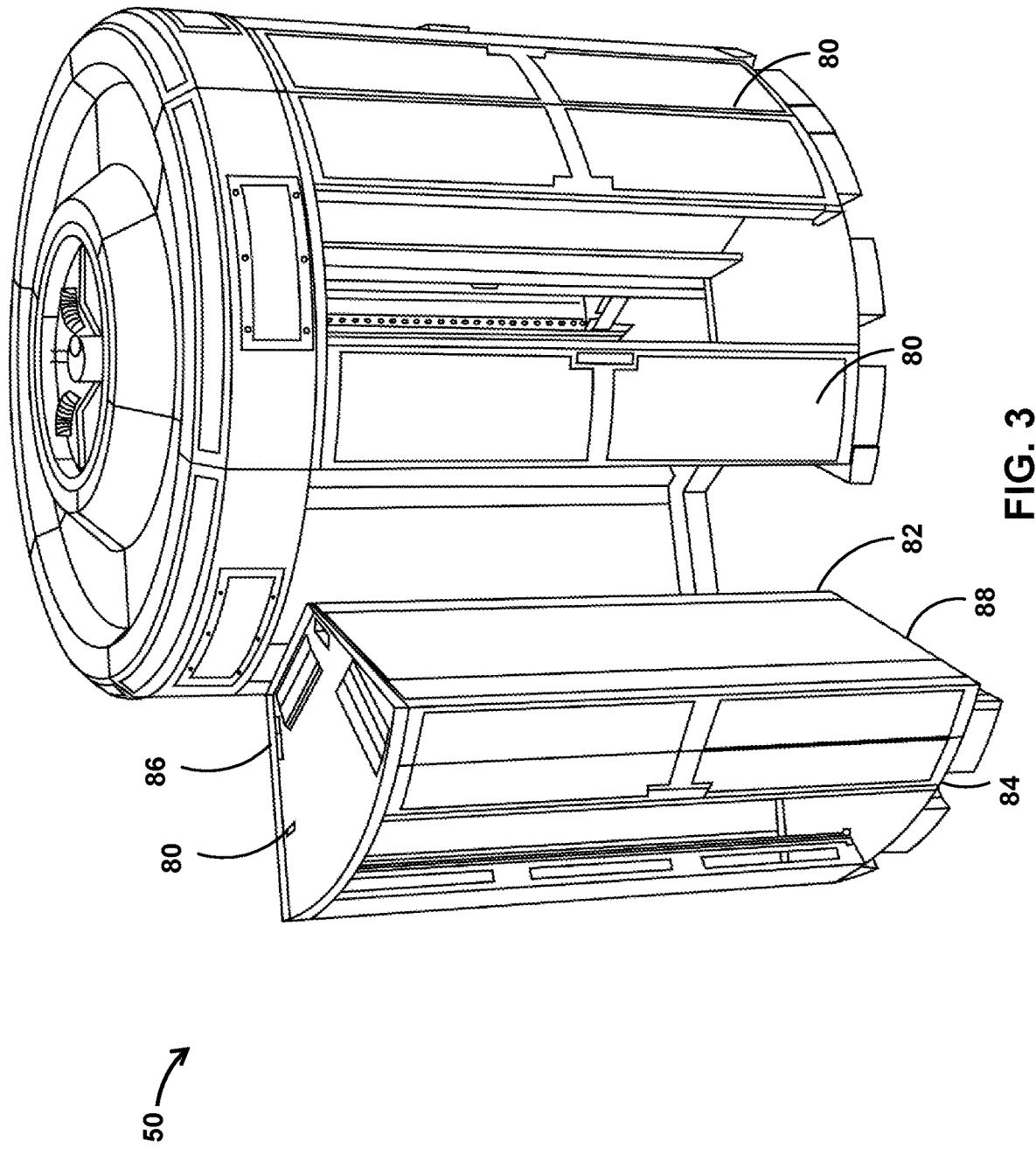
FIG. 3 is a partially exploded perspective view of a rack assembly that may be positioned within the compute module of FIG. 2 in accordance with some embodiments of the present techniques.

FIG. 3 shows additional details of the rack assembly 50. In some embodiments, the rack assembly 50 includes a chamber like that described in U.S. patent application Ser. No. 15/065,201, titled COOLING SYSTEM FOR DATA CENTER RACK, filed 9 Mar. 2016, and U.S. patent application Ser. No. 15/065,181, titled RACK FOR COMPUTING EQUIPMENT, filed 9 Mar. 2016, the contents of each of which are hereby incorporated by reference. In some embodiments, the rack is controlled via the facility controller or a dedicated rack controller via the techniques described in U.S. patent application Ser. No. 15/065,212, titled OUT-OF-BAND DATA CENTER MANAGEMENT VIA POWER BUS, filed 9 Mar. 2016, U.S. patent application Ser. No. 15/366,554, titled DATA CENTER MANAGEMENT, filed 1 Dec. 2016, U.S. patent application Ser. No. 15/366,528, titled DATA CENTER MANAGEMENT, filed 1 Dec. 2016, and U.S. patent application Ser. No. 15/400,648, titled DATA CENTER MANAGEMENT VIA OUT-OF-BAND, LOW-PIN COUNT, EXTERNAL ACCESS TO LOCAL MOTHERBOARD MONITORING AND CONTROL, filed 6 Jan. 2017, the contents of each of which are hereby incorporated by reference. In some embodiments, the rack assembly 50 includes a base like that described in U.S. patent application Ser. No. 15/218,650, titled RACK FOR COMPUTING EQUIPMENT, filed 25 Jul. 2016, the contents of which are hereby incorporated by reference, and racks may be loaded into the compute module 12, onto the rack assembly with the self-guiding bearings described therein.

The illustrated rack assembly 50 includes a plurality of wedge-shaped racks 80. In some embodiments, the wedge shape racks 80 may each be identical and may collectively, when placed side-by-side, form a right circular cylinder, having a hollow right, circular cylinder (or pentagon, hexagon, heptagon, or octagon) interior through which air flows. As illustrated, with exploded wedge rack 80, the wedge racks 80 may be inserted or removed from the rack assembly 50. In an interior, rear portion 82 of each wedge rack 80 may be narrower in width than an exterior portion 84, and sides 86 and 88 may form an acute angle, for instance, less than 45°, less than 35°, less than 20°, or less than 10°, relative to one another. In some embodiments, each wedge rack 80 (or other types of racks, like traditional hot-aisle racks) may include a plurality of access barriers described below (such as lockers) that segment a plurality of rack units within the wedge rack, and computing devices may be mounted within the edge rack and connected to power and networking infrastructure of the rack assembly 50 and the compute module 12. In some cases, the lockers may segment other types of racks, like traditional hot-aisle racks, e.g., with a matrix of lockers arrayed in two dimensions along a plane.

Figure 4:
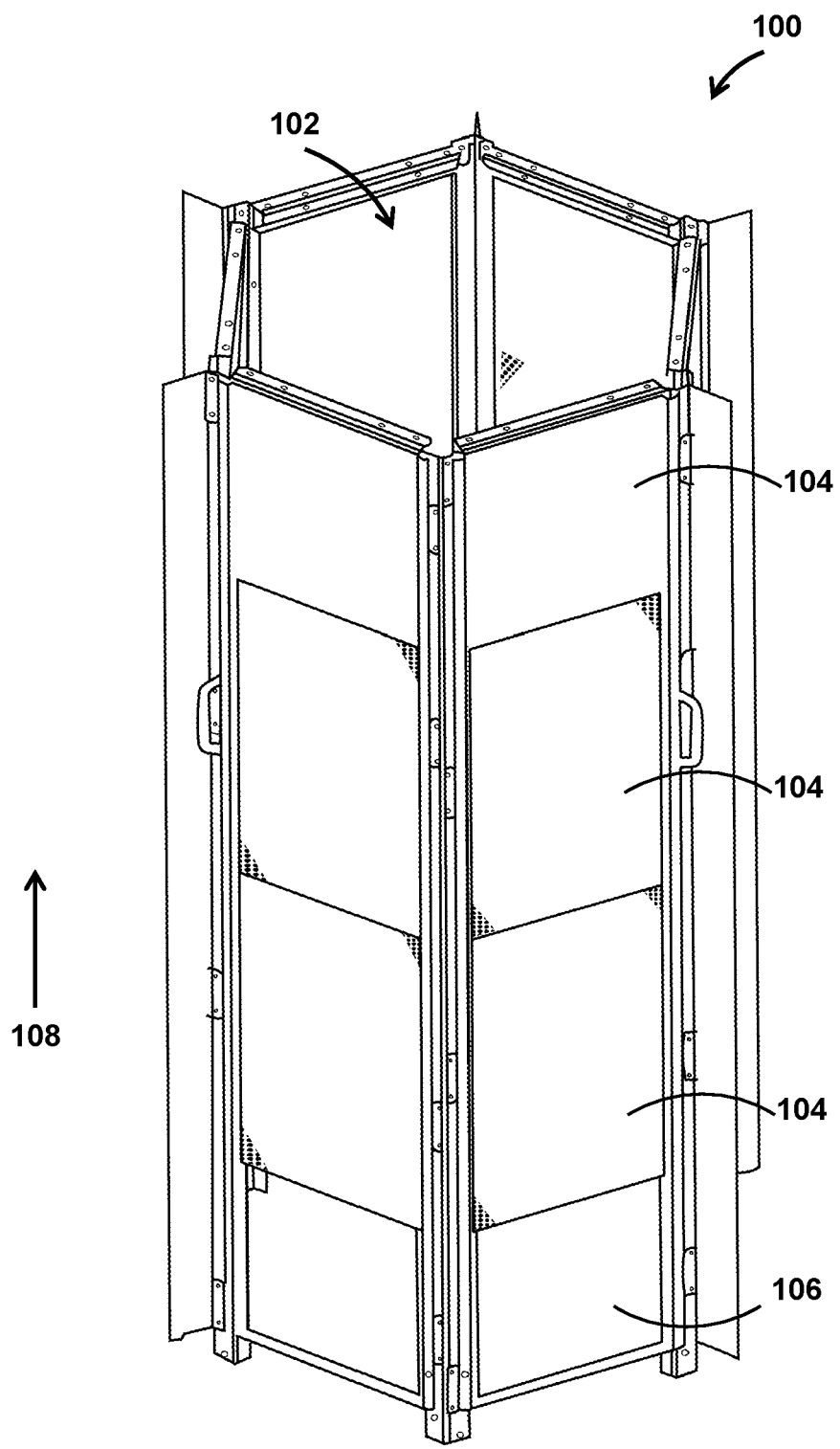
FIG. 4 is a perspective view of a core assembly that may be disposed within the rack assembly of FIG. 3 in accordance with some embodiments of the present techniques.

In some embodiments, the rack assembly 50 of FIG. 3 may include a core assembly 100 in FIG. 4. The core assembly 100 may be positioned in a central interior portion of the rack assembly 50 and may define a central airflow column 102 through which air or other cooling fluids may flow through before or after passing over the rack-mounted computing equipment within the wedge-shaped racks 88, which may be rotationally symmetrically disposed around the core assembly 100 in the rack assembly 50. In this example, the core assembly 100 has a right hexagonal pyramid shape, with one side corresponding to each of the rack wedge racks 80 in FIG. 3. A rear portion 82 of each wedge rack 80 may be exposed to one of the faces on one of the sides of the core assembly 100. In some embodiments, the core assembly 100, in each face, may include a vertical array of panels 104 and in some cases an opening at the bottom, each of which may be adjusted to modulate an amount of airflow over rack-mount the computing equipment positioned up or downstream in a corresponding wedge-shaped rack positioned adjacent a side of the core assembly 100. In some cases, the panels 104 and a bottom opening in some cases may cause upstream portions of the column of airflow of core assembly 100 to have lower resistance to airflow than downstream portions, e.g., a bottom opening may offer a lowest resistance, an adjacent panel 104 may have an array of apertures that prove more resistance, and a next panel 104 may have an array of apertures that provide even more resistance to airflow. In some embodiments, each of the panels 104 is removable. In some embodiments, some or all of the panels 104 may be replaced with a resistive panel, such as a filter, like a grating, configured to modulate an amount of pressure drop across the corresponding panel 104 in a given region of the core assembly 100 for a given wedge-shaped rack 80. In some embodiments, the panels 104 may include a rectangular array of rectangular slots, with different panels 104 on a given side of the core assembly 100 having different slot sizes and resistances to airflow, in some cases with resistance increasing along a height in a vertical direction 108 of the core assembly 100 and the rack assembly 50. In some cases, this arrangement may reduce the likelihood of negative pressure developing on an upstream portion of the rack assembly, causing hot air within the interior volume 102 to flow back out over computing equipment in an upper portion of the rack assembly 50 (thereby undesirably heating that equipment rather than cooling it). In some embodiments, panels 104 may be replaced or otherwise adjusted based on whether computing equipment has been positioned within a corresponding locker of a rack assembly wedge-shaped rack 80, like those described below with reference to FIGS. 5 and 6.

Figure 5:
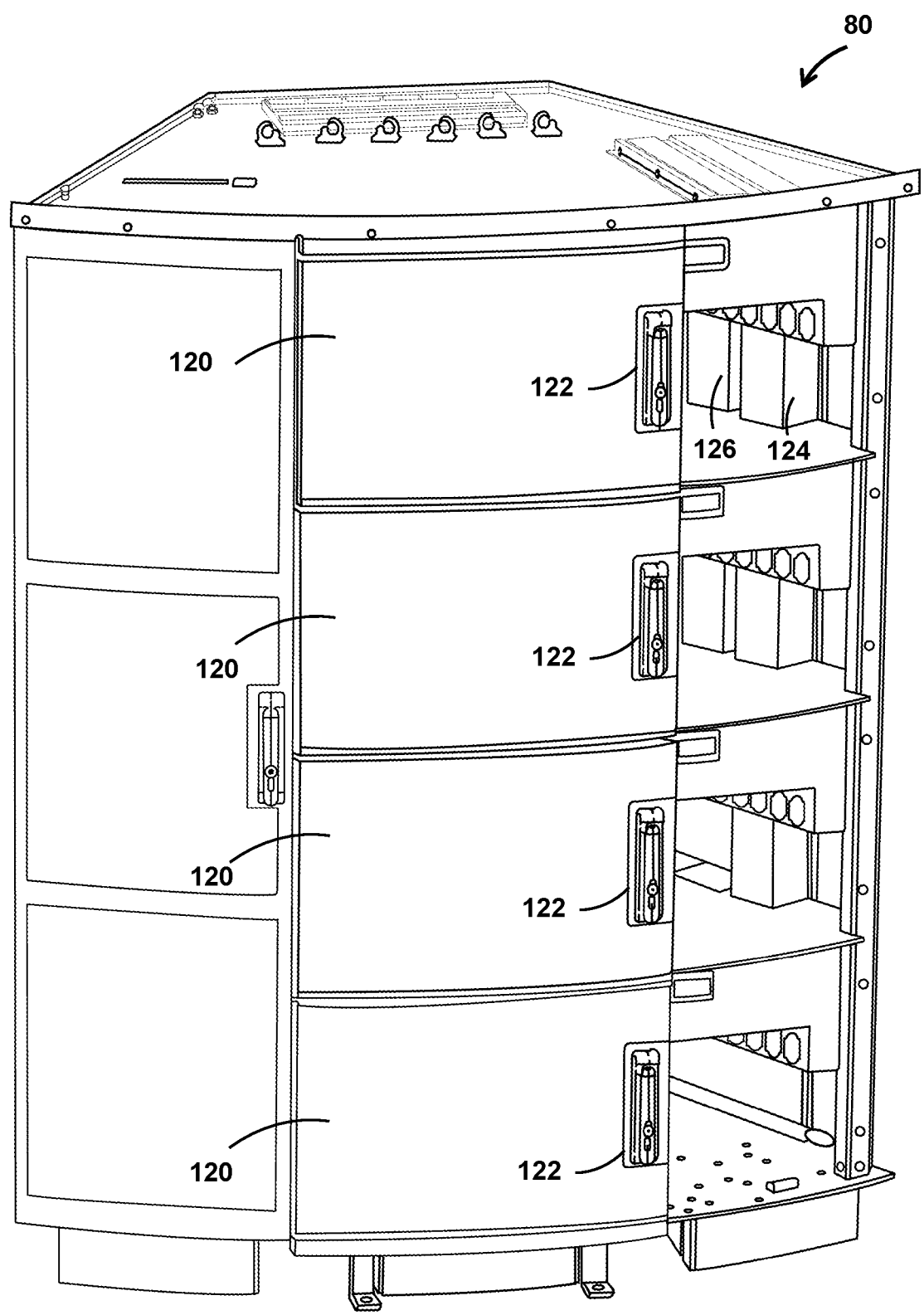
FIG. 5 is a perspective view of a wedge-shaped rack of the rack assembly of FIG. 3 in accordance with some embodiments of the present techniques.

FIGS. 5 and 6 show an example of the wedge-shaped racks 80 with a plurality of access barriers 120 that segment and isolate different subsets of computing devices within the rack assembly 80. In some embodiments, each access barrier 120 may include a plurality of rack units of computing devices or capacity to hold rack-mounted computing devices. In some embodiments, rack units are vertical segments of the wedge-shaped rack 80 configured to hold standardized sized rack-mounted computing devices, such as servers, hard drive arrays, graphical processing units, tensor processing units, computer storage devices, networking equipment, and the like.

In some embodiments, each access barrier 120 includes a lock 122. In some embodiments, the lock is a mechanical lock that is openable upon insertion and turning of the key that disengages a latch that otherwise holds the respective access barrier 120 (e.g., a locker door) closed against the wedge-shaped rack 80. In some embodiments, the locks 122 are electronic locks, for instance, controlled responsive to user inputs via an NFC card placed against an NFC transceiver of the respective access barrier or of the respective wedge-shaped rack, or of the rack assembly 50 or the compute module 12, such as at the security user interface 22. In some embodiments, any of the interfaces described above with reference to the security user interface 22 may also be applied to the locks 122. In some embodiments, the electronic locks may selectively engage or disengage a solenoid holding a pin in an aperture of the respective door of the respective access barrier 120, thereby freeing the door 122 open. In some embodiments, the number of access barriers 120 may be selected for a given wedge-shaped rack 80 based on a desired granularity with which rack units are to be divided and isolated. In the illustrated example, the vertical array of rack units within the wedge-shaped rack 80 are evenly divided among four access barriers 120. In some embodiments, the number of rack units may be unevenly divided, for example, with more in some lockers and fewer in others. In some embodiments, a different number of access barriers 120 may be present, for example 2 or more, 3 or more, 5 or more, or 10 or more, on a given wedge rack. Different wedge racks in the assembly 50 may be identical, or different wedge racks may have different arrangements of access barriers 120.

In this example, each access barrier 120 includes a dedicated power supply 124 and rack controller 126 (e.g., only controlling/powering units within a secure envelope of the access barrier 120). In some embodiments, the power supply 124 is connected via techniques like those described in U.S. patent application Ser. No. 15/257,105, titled BUS BAR POWER ADAPTER FOR AC-INPUT, HOT-SWAP POWER SUPPLIES, filed 6 Sep. 2016, and includes an uninterruptable power supply like that described in U.S. patent application Ser. No. 15/257,105, titled COMPACT UNINTERRUPTABLE POWER SUPPLY, filed 6 Sep. 2016, the contents of each of which are hereby incorporated by reference. In some embodiments, the power supply 124 may provide both direct current power and an out of band network connection to rack mounted computing equipment by which configuration and control of the rack mounted computing equipment may be effectuated with the rack controller 126, in some cases responsive to commands communicated remotely.

In some embodiments, each of the access barriers 120 may include an independent fire suppression system and sensor configured to detect smoke or heat from a fire and, in response, trigger the corresponding fire suppression system. In some embodiments, the fire suppression system may be a chemical fire suppression system that emits a gas that displaces oxygen from a compressed gas cylinder within the corresponding locker, thereby potentially preventing a fire in one locker from causing damage to computing devices in a different locker. Some embodiments may actuate louvers or other member to obstruct airflow in a corresponding one of the panels 104 responsive to detecting a fire to eliminate airflow to the fire.

Figure 6A:
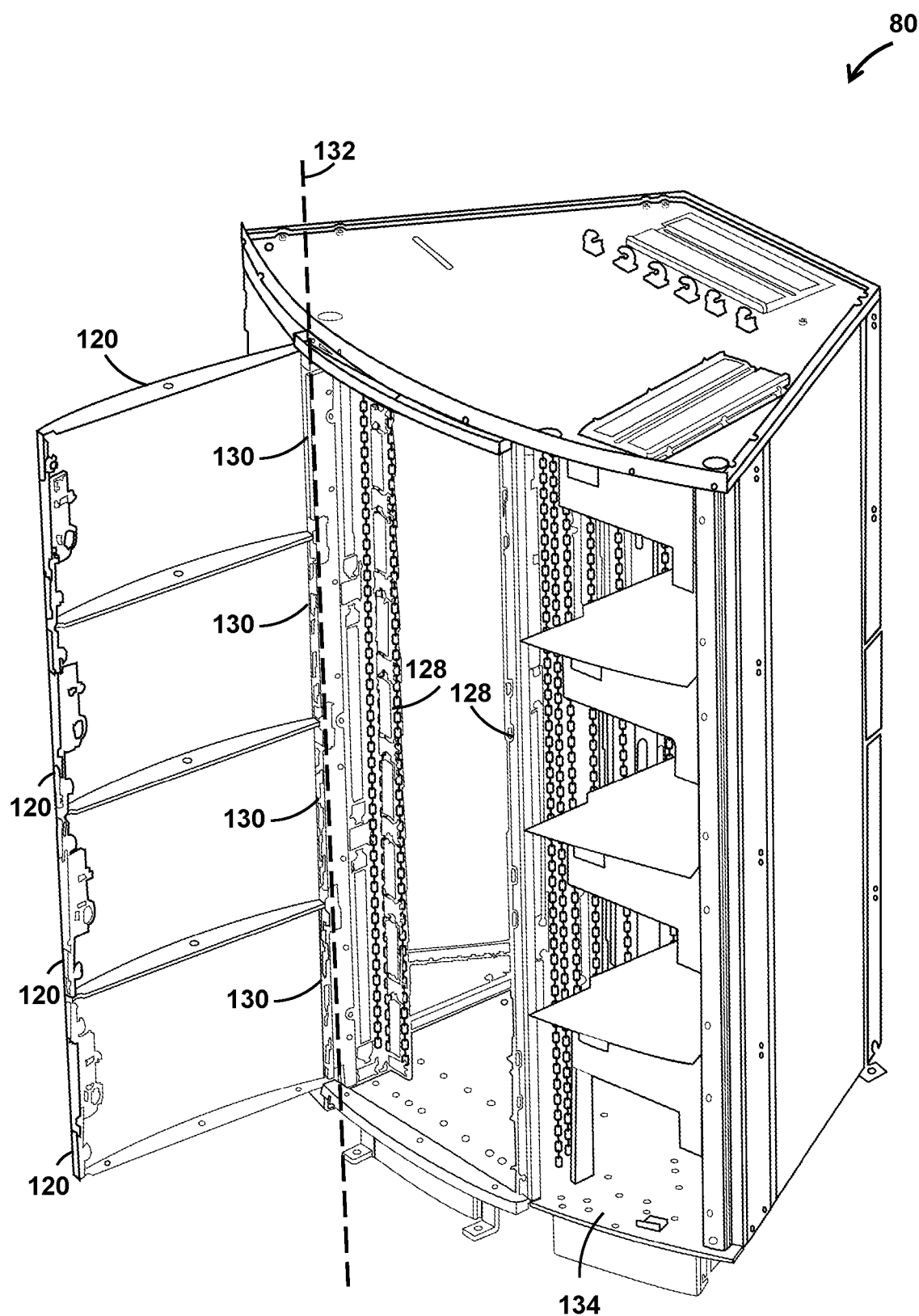
FIG. 6A is another perspective view of the wedge-shaped rack of FIG. 5.

FIG. 6A shows the wedge-shaped rack 80 with access barriers 120 all open. In some embodiments, in some use cases, different access barriers 120 may be open at different times relative to one another, and each of the access barriers 120 may have a door configured to move independently of the other doors. In some embodiments, the space behind each of the doors may be bounded by metal plates, not shown, normal to the axis 132, that prevent a user who has opened one of the doors from reaching into a region behind a different one of doors. In some embodiments, these plates (e.g. metal plates) may bound a top and bottom of a generally rectangular region corresponding to each of the lockers behind the doors, with the rectangular region being defined on a rear side by a portion of the core assembly 100.

In some embodiments, the interior of the wedge-shaped rack 80 may include four vertical bars 128 configured to mount to rack-mountable computing equipment, with two vertical bars 128 in a front of the interior of the wedge-shaped rack 80 and two vertical bars in a rear portion, in accordance with the chamber design incorporated by reference above.

In this example, each of the doors is coupled to the wedge-shaped rack 80 by a hinge and is configured to pivot independently of one another about a vertical axis 132. In some embodiments, a corresponding door may be placed over the region 134 in which power supplies and rack controllers are disposed, or in some cases a single metal plate may cover this region, with access being available by reaching in through a side of this region opened when the corresponding locker door 120 is open. In some embodiments, the doors may move relative to the rack assembly 50 through other mechanisms. In some embodiments, locker doors 120 may be configured to slide side to side in slots, pivot up and down about axes orthogonal to the axis 132, for example, with vertical or with hinges at a top or bottom of the locker doors 120. In some embodiments, the locker doors 120 may be removable panels that are selectively removable upon authenticating a user. (Movement of these doors and other smaller components (e.g., less than ⅛ by volume) is distinct from movement of the assembly 50 itself, as described below.)

In some embodiments, the access control techniques described above may be applied to the doors of access barriers 120, for example, where electronic locks are used. In some embodiments, the facility controller, in communication with a remote application, may determine whether to electronically locker unlock a door of an access barrier 120 responsive to a user's credentials supplied via the security user interface 22 or one of the electronic locks 122. Upon opening a corresponding door 120, users may insert or remove rack-mountable computing equipment. In some embodiments, the computing equipment may be front-access computing equipment, for instance with a blind mate connector to data and power connections, and some cases combined in a DC bus bar, at a rear portion of the wedge-shaped rack, as described in the applications and patents incorporated by reference.

Thus, in operation, a technician may, upon obtaining physical access to wedge-shaped-shaped rack 80, and supplying the appropriate credentials (e.g., a key, a pin code, a NFC card, a biometric reading, or the like) to open one of the doors of access barriers 120, may open that door, and insert or remove a rack-mountable computing device into a corresponding volume within one of the access barrier behind the door. In the course of doing so, that technician may be denied physical access to other rack-mounted computing devices behind other doors of other access barriers, in some cases behind steel plates separating lockers in the wedge-shaped rack 80. For example, a steel plate may span horizontally across the wedge-shaped rack 80 near or at where each pair of adjacent locker doors meet, for example, with three such steel plates defining four volumes. The doors, in some cases, may include an array of holes (e.g., a grating) to provide for airflow through the rack.

Figure 6B:
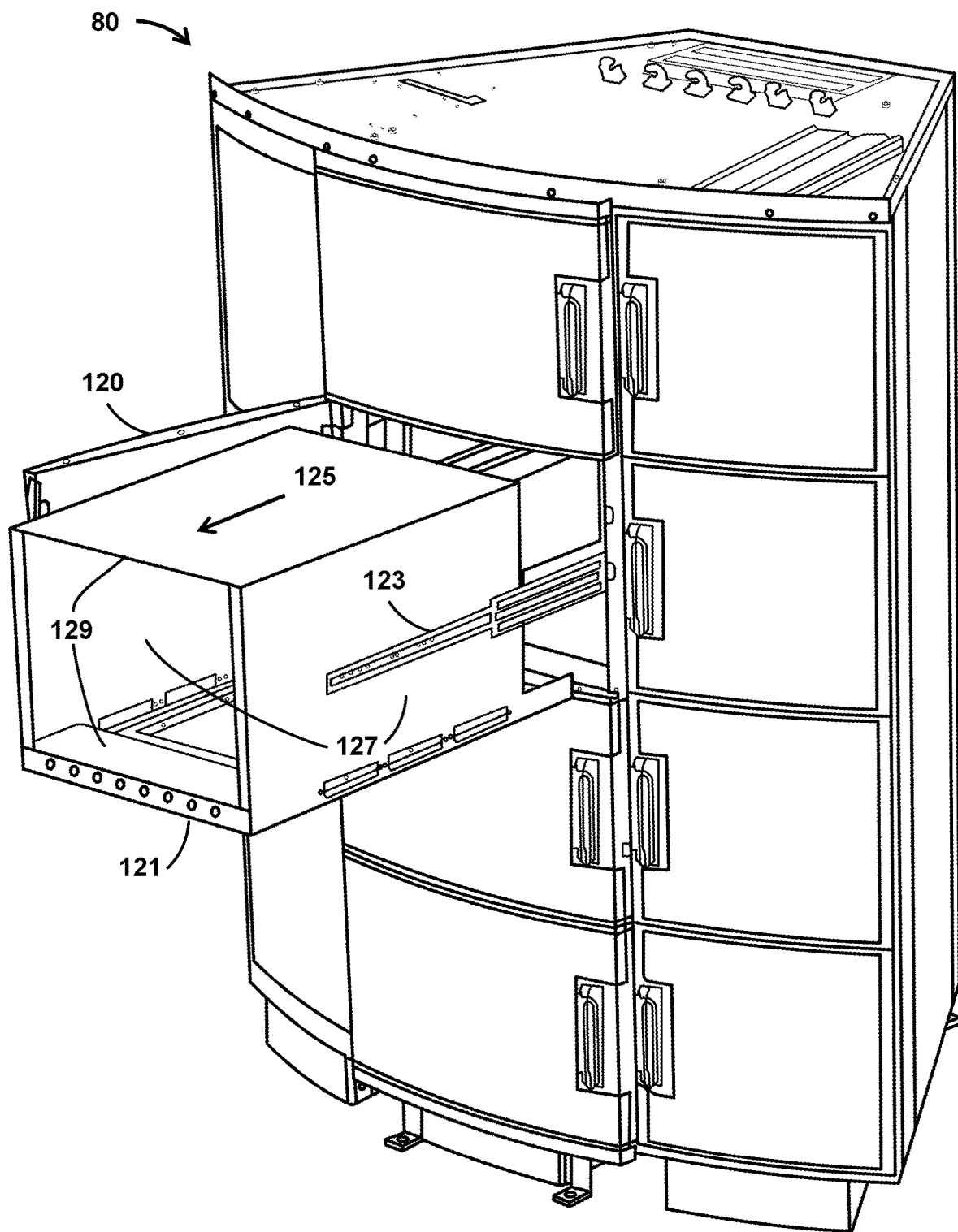
FIG. 6B is another perspective view of the wedge-shaped rack of FIG. 5 with shelving and drawers added.

FIG. 6B shows the wedge rack 80 above with a drawer 121 that constrains access to the interior of the drawer 121 from above or below, e.g, when adjacent locker doors 120 are opened. In some embodiments, the drawer 121 is configured to translate with a single degree of freedom relative to the rack 80, e.g., orthogonal to the below described axis of rotation. Some embodiments may translate radially outward along axis 125, riding on telescoping rails 123 mounted to the rack 80. In some cases, the drawer 101 may define a top and bottom 129 and sides 127. In some cases, these access barriers may be made of a material that is difficult to penetrate, e.g., metal plate.

Figure 7:
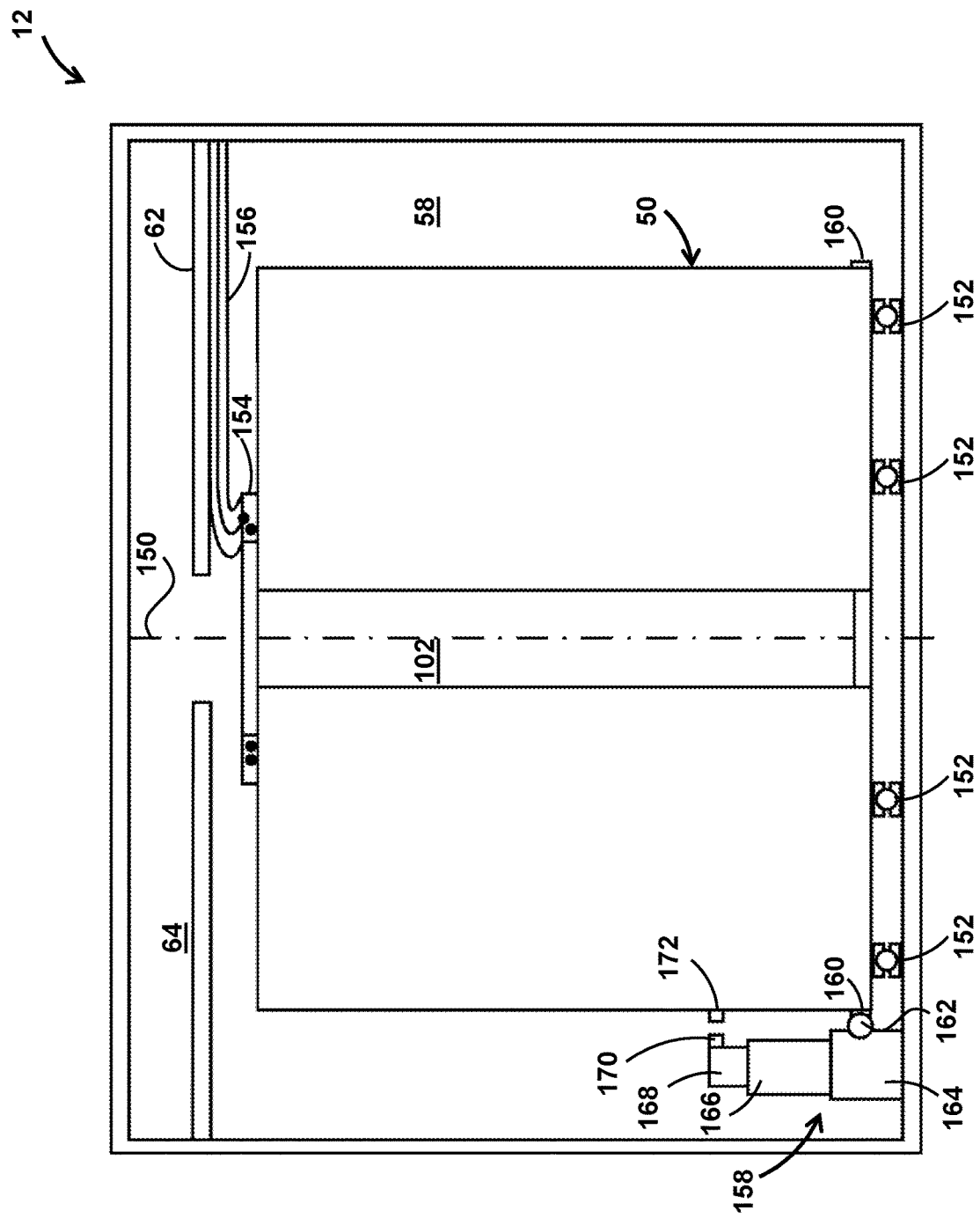
FIG. 7 is a cross-sectional elevation view of the compute module of FIG. 2 in accordance with some embodiments of the present techniques.

FIG. 7 is a cross-sectional view of the compute module 12 through the cross-section labeled with reference letter A in FIG. 2. As illustrated, in some embodiments, the rack assembly 50 may be configured to rotate about a vertical axis 150. In some embodiments, the rack assembly 50 may be supported by the compute module 12 via a plurality of thrust bearings 152, such as concentric rings of rotationally symmetric arrays of thrust bearings 152 configured to carry the weight of the rack assembly 50 while applying relatively little friction to rotational movement of the rack assembly 50 about axis 150 and constraining lateral translation of the rack assembly 50 orthogonal to the axis 150 or rotation of the rack assembly 50 about axes other than axis 150. The thrust bearings 152 may mount directly to the base of the assembly 50 or a table upon which the base rests. In some embodiments, other types of bearings may be used. For example, some embodiments may space the rack assembly 50 off a floor of the compute module 12 with rollers, the floor of the compute module 12 may include concentric rings of rails on which wheels of the rack assembly 50 ride (e.g., with an inverted U-shape overlapping the rails like a train wheel), or the rack assembly 50 may be supported by air bearings.

In some embodiments, the compute module 12 includes a cable management system 154 configured to manage cables 156 through movement of the rack assembly 50 relative to the compute module 12. In some embodiments, the cables may include power cables, networking cables, and cables carrying cooling fluids, such as liquids. In some embodiments, the cable management system 154 is a rotary type cable management system configured to manage rotation of the rack assembly 50 through ±180° or less. In some embodiments, for example, where other types of movement are applied, such as linear movement, the cable management system 154 may be a linear cable management system. In some embodiments, the cable management system 154 may include a cage of hinged plastic segments that form a flexible box around the cables 156 and configured to collectively flex within a relatively limited range of movement (e.g., less than 90 degrees between any two segments of a chain of the plastic boxes), for instance, with a single degree of freedom, with a constrained amount of crimping, to keep cables 156 from tangling and avoiding crimping of the cables 156 during movement. In some embodiments, the cables 156 and cable management system 154 may be positioned below the plenum 64 to avoid having the cables 156 exposed to hot exhaust air. In some embodiments, relatively cool air in the room 58 may be drawn through the rack assembly 50 into the interior column 102 and up into the plenum area 64 by the above-described blowers or fans 34 in the cooling module 14.

In some embodiments, the movement of the rack assembly 50 may be actuated by a rack drive 158. In some embodiments, the rack drive 158 may include an array of gear teeth 160 rotationally symmetrically and circumferentially arrayed around the rack assembly 50. The rack drive 158, in some embodiments, may engage these gear teeth with, for example, a screw drive 162, or a cable coupled to a smaller gear having teeth of corresponding size to obtain a relatively large gear reduction ratio, for instance, greater than 10 to 1, greater than 100 to 1, or greater than 1000 to 1. Some embodiments may further include a transmission 164 that drives the screw assembly 162 or belt drive. The transmission 164, in some embodiments may include further arrangements of reducing gears, examples, including a harmonic drive, which may have relatively low backlash and a relatively large gear reduction ratio, or other type of transmission. In some embodiments, the transmission 164 may have a gear reduction of greater than 50 to one or greater than 100 to 1.

The transmission 164 may be driven by an electric motor 166, such as an induction motor or synchronous electric motor. In some embodiments, the transmission 164 may be driven by a pneumatic motor or hydraulic motor. In some cases, motor controls and power conditioning circuitry of the motor may be shielded from computing equipment in the rack assembly 50 by electromagnetic shielding to mitigate interference with sensitive electronics.

The motor 166 and other aspects of the compute module 12 may be controlled by a facility controller 168, which may interface with the electronic locks and security user interface described herein, and the above-described remote application by which the control module compute module 12 is remotely managed. In some embodiments, the facility controller 68 may be coupled to a rotation sensor 170 which may sense the presence of a marker 172 indicative of a rotational position of the rack assembly 50. In some embodiments, the rotational sensor 170 is an optical sensor and the marker 172 is an array of regularly spaced black bars on a white background arrayed around the rack assembly 50. Or the marks may be a reflective area on an absorbent background. The sensor 170 may detect a change in reflected light as an indication of position. In some embodiments, the facility controller or sensor 170 may count a number of bars (or changes in signal from the sensor 170) that have gone past to ascertain an angular position of the rack assembly 50 and determine whether to continue driving rotation of the rack assembly 50 to reach a target position corresponding to a web track a given user is authorized access. In some embodiments, the marker 172 is a magnet and the sensor 170 is (e.g., a Hall effect sensor) configured to sense a position of the magnet, indicating that the rack assembly 50 has reached a maximum permitted angular movement. In response, the facility controller 68 or the sensor 170 may instruct the motor 166 to cease driving rotation of the rack assembly 50. In some embodiments, the rack assembly 50 may be configured to rotate through a range of less than or equal to 360°, for instance, plus or minus 180° of a zero angular position.

Figure 8:
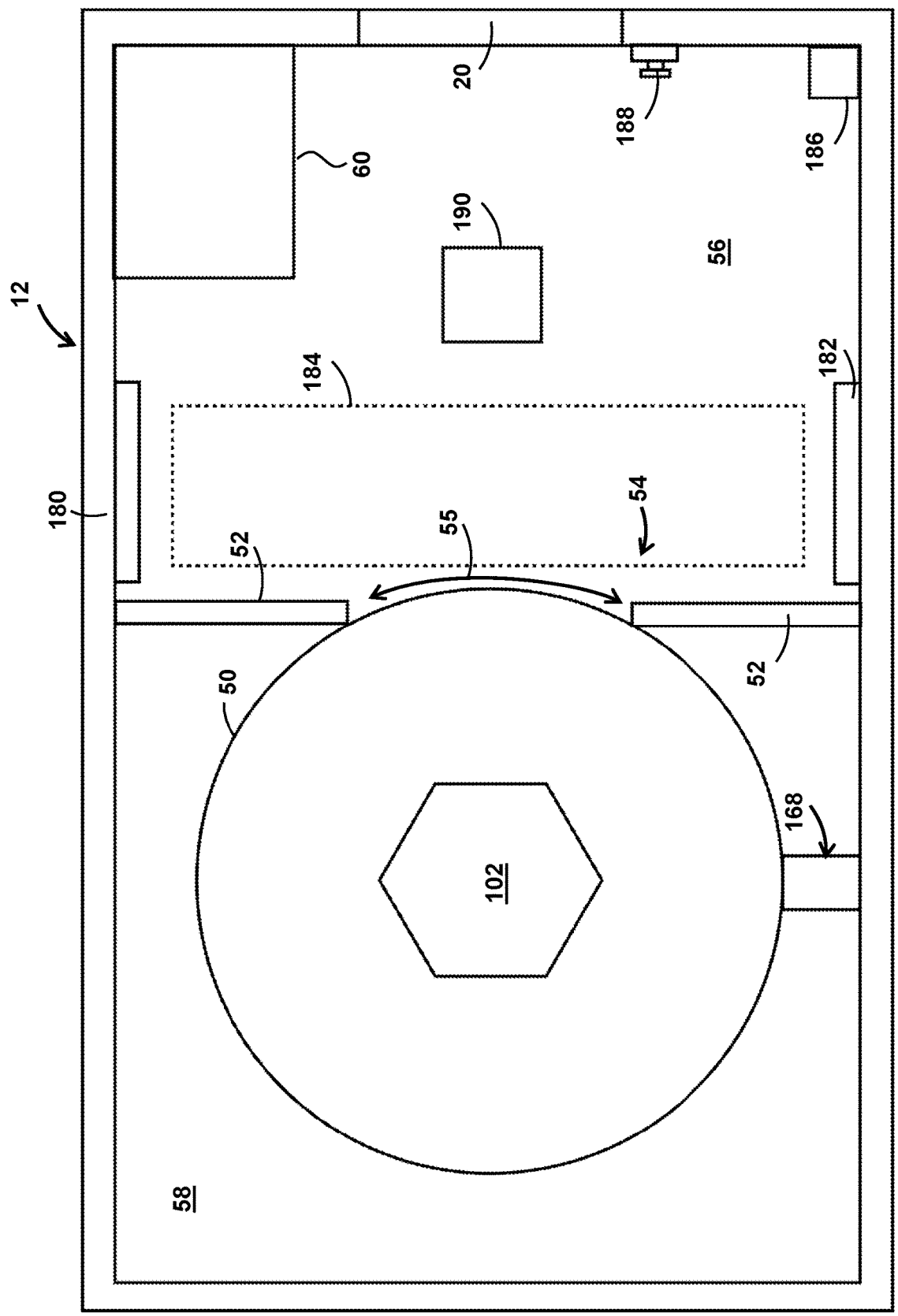
FIG. 8 is a cross-sectional plan view of the compute module of FIG. 2 in accordance with some embodiments of the present techniques.

FIG. 8 shows another cross-section of the compute module 12 corresponding to the reference B in FIG. 2. This is a plan view cross-section of the compute module 12. As mentioned, for various reasons, it may be desirable to ascertain whether a technician is within the technician access room 56 before initiating movement of the rack assembly 50. Some embodiments may determine based on various signals from various sensors, examples of which are described below, whether a technician is in a given portion of the room 56, is not in a given portion of the room 56, or has exited the room 56, and responsive to these signals, selectively drive movement of the rack assembly 50 with the drive 168.

Various safety interlocks are described, but other safety interlocks may be used, subsets of the safety interlocks may be used, or some embodiments may omit safety interlocks, none of which is to suggest that any other described feature must be present in all embodiments. Some embodiments may include a light curtain having a light source 180 and a light sensor 182. In some cases, the light curtain 180 may include an array of light emitting diodes or lasers directed at the light sensor 182, which may detect obstruction of beams of light across the room 56, for example, by a technician who is still within a portion of the room 156 that is being sensed. Signals from this sensor or the various other safety interlocks may be transmitted to the facility controller which may determine whether to actuate movement of the rack assembly 50 based on the position of the technician or absence of the technician in the room 56.

In another example, some embodiments may include a weight sensor, such as a strain gauge coupled to a floor of the room 56 that senses the weight of a human being in a weight sensitive region 184. A sensed weight, or proxy thereof, such as strain, which is consistent with sensing weight, may be compared against a threshold to determine whether a human being is present in the room 56 or is present and a designated portion of the room 56. Similarly, some embodiments may compare an amount of light in a light curtain that is obstructed against the threshold to determine whether a person is present in a sensed region.

Some embodiments may apply other types of sensors to regions of the room 56 to determine whether a human is or is not in that region. Examples include infrared cameras, ultrasonic transducers responsive to reflected or obstructed ultrasonic signals, cameras operating the visual spectrum, depth sensing cameras, motion sensors, and the like, each of which may feed their signals into the rack the facility controller, which may determine whether to actuate the movement of the rack assembly 50 based upon those signals. For example, some embodiments may compare an image from a camera 186 imaging the room 56 when the room is known to be empty to an image from the camera 186 taken prior to (e.g., upon receiving a request for) movement. Upon determining that more than a threshold amount of pixels are different between the two images, some embodiments may infer some object is in the room, such as a human being, and some embodiments may determine not to actuate movement or, in the alternative, upon determining that the pixels in the two images are sufficiently similar, for example, an aggregate, like root mean square or average amount of difference between pixel values, is less than a threshold, some embodiments may determine to actuate movement. Some embodiments may continue to monitor the sensors during movement of the rack assembly 50, for example, periodically or responsive to interrupts, and some embodiments may determine to stop movement upon such a signal indicating the presence of a human being in a designated region.

In some embodiments, the safety interlock may include a button or key trap 188 that ensures a human being is in a defined location relatively far from the rack assembly 50 before initiating movement. For example, the button 188 may be a normally open button, such as a button biased open via resilient member, and the human being may press that button and hold it in a closed position, which may produce a signal that causes the facility controller to allow movement of the rack assembly 50.

Some embodiments may include a stand 190 for a technician to position a laptop or other terminal, which in some cases may have cables connected to the above-describable cables, for instance, an out of band network, by which a technician may communicatively access rack-mounted computing equipment.

Figure 9:
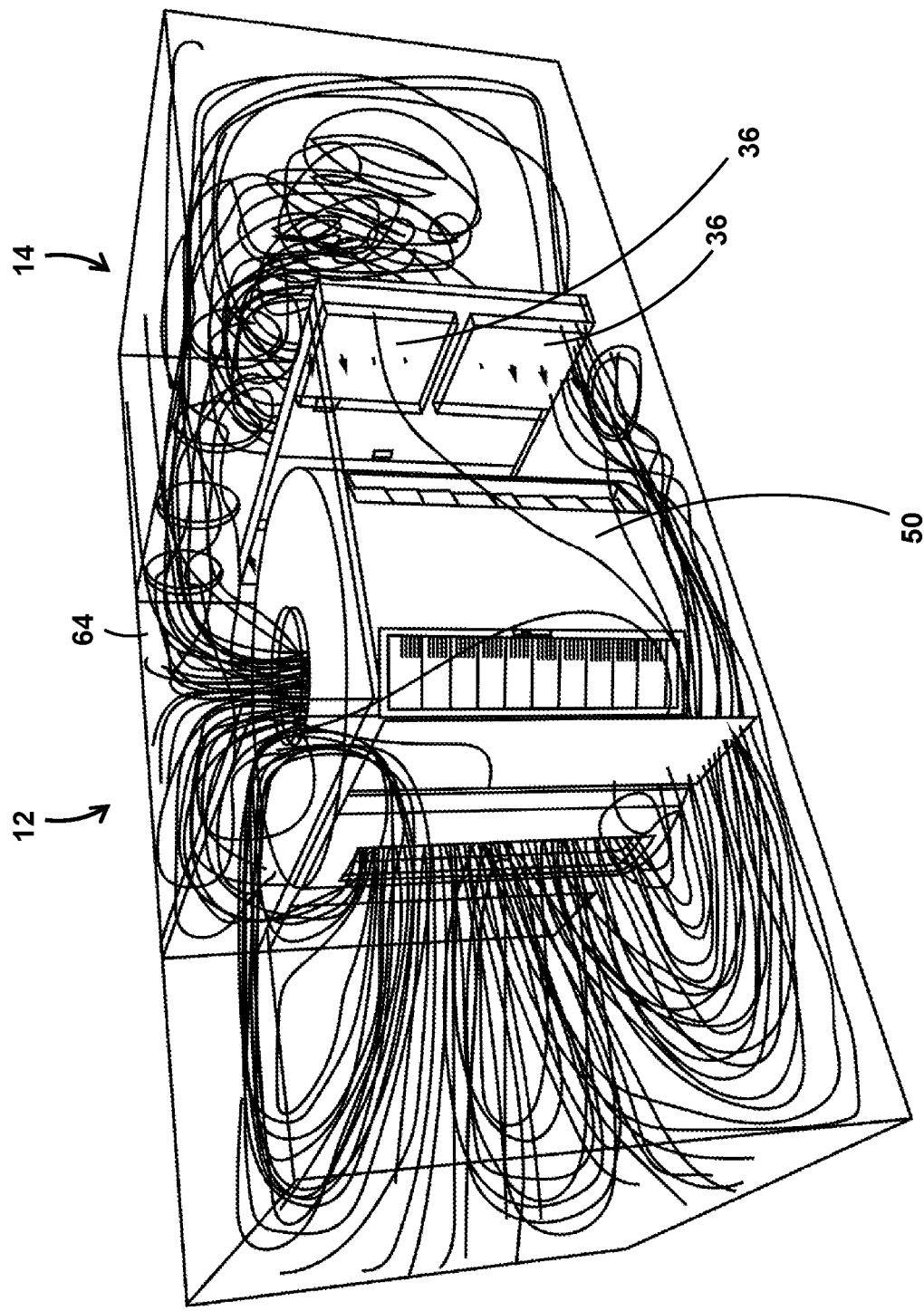
FIG. 9 is a fluid flow simulation perspective view of airflow through the modular data center of FIG. 1 in accordance with some embodiments of the present techniques.

FIG. 9 shows an example of simulated airflow through the compute module 12 and cooling module 14. As illustrated, and some embodiments, relatively cool air may flow into the compute module 12 through heat exchangers 36, and that air may mix into the ambient air within the cooling module 12 before being drawn into the rack assembly 50, through, for example perforated openings, like a steel mesh, forming the above-described locker doors, flowing over the rack-mounted computing equipment, passing through apertures in the above-described panels 104 of the central assembly 100, then flowing up through the core channel 102 and into the Plenum area 64 as relatively hot air, before being drawn back through into the cooling module 14 by the above-described fans or blowers 3234. Or in some embodiments, the direction of fluid flow may be reversed. In some embodiments, this fluid flow may be relatively space efficient and avoid the spatial overhead imposed by traditional hot aisle approaches in which rectangular racks are arrayed in Rose, though it should be emphasized that such arrangements are not disclaimed and that some of the present techniques may also be applied in hot aisle designs.

Figure 10:
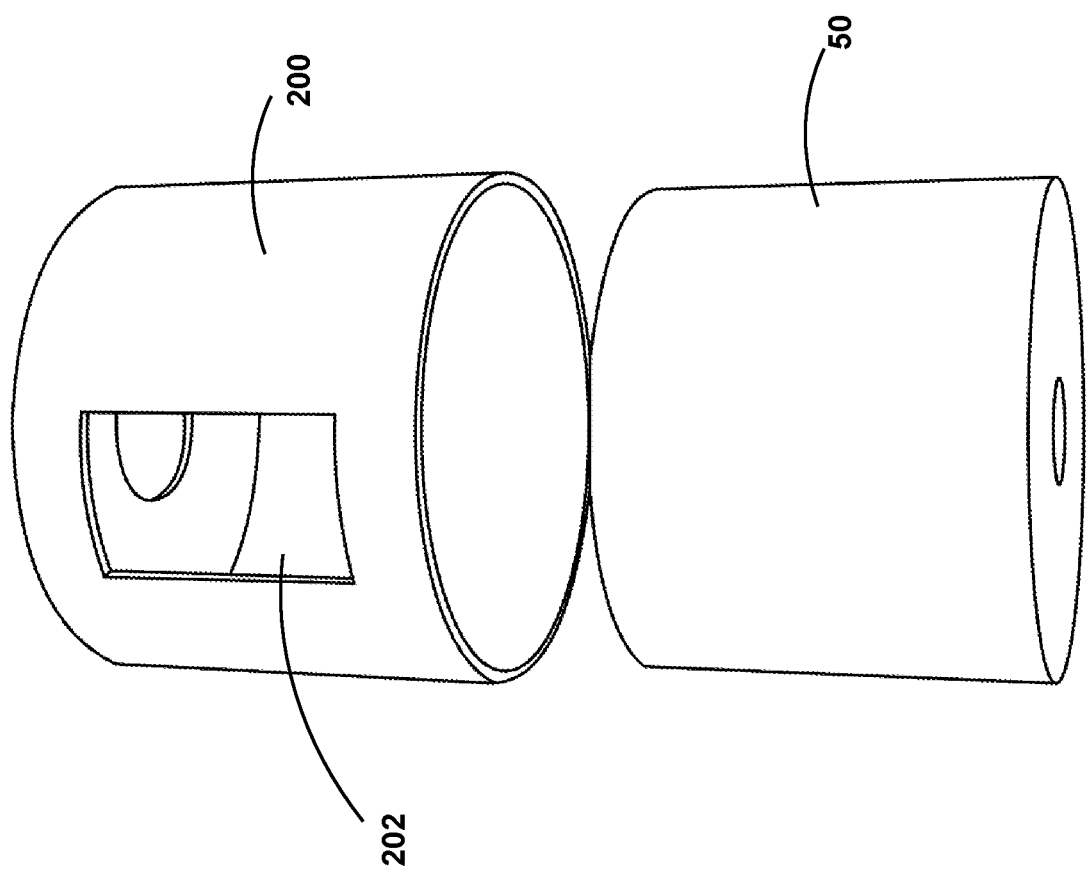
FIG. 10 is another example of a rack enclosure and rack assembly that move relative to one another in accordance with some embodiments of the present techniques.

FIG. 10 shows an example of another embodiment with a different form of relative movement between the rack assembly and rack enclosure. In this example, the rack assembly 50 is static and a rack enclosure 200 is configured to move around the rack assembly 50, positioning an opening in the rack enclosure 202 through which access is selectively granted in virtue of its position. In some embodiments, the above-described drive mechanism may be applied to the rack enclosure 200, which may also rest on thrust bearings, and a circular compute module may provide a circular hallway around the assembly for by components illustrated in FIG. 10.

In the above-described examples, there is a single degree of freedom between the rack enclosure and the rack assembly, in some cases with one remaining static and the other moving or vice versa. In some embodiments, both components may move relative to one another, e.g., with one or more degrees of freedom of movement. In some embodiments, there may be additional degrees of freedom. For example, the rack assembly 50 may further be configured to translate vertically along the axis of rotation, for example, with a pneumatic or hydraulic lift positioned underneath a chassis supporting the above-described thrust bearings. Or some embodiments may include a rack assembly 50 like that described above configured to rotate but not translate vertically and a rack enclosure like the rack enclosure 200 configured to translate vertically, selectively exposing different subsets of a vertical portion of a rack through aperture 202, without the enclosure 200 rotating. Thus, some embodiments may include systems with two degrees of freedom of relative movement between the rack assembly and the rack enclosure. In some cases, there may be fewer than four degrees of freedom of relative movement between the rack enclosure and rack assembly, e.g., less than three or less than two degrees of freedom of relative movement. Some embodiments may have multiple rack assemblies within a single rack enclosure (e.g., with multiple access apertures and different apertures providing access to different moveable racks). Some embodiments may have multiple rack enclosures for a single rack assembly, e.g., a first rack enclosure may rotate to position an aperture to select a wedge rack and a second, enveloping rack enclosure may have a shorter aperture and may translate up and down to select a subset of the wedge-rack, e.g., exposing a different subset of a column of rack-mounted computing devices in the wedge rack selected by the inner rack enclosure.

Other embodiments may apply other types of movement. Some embodiments may include free-standing racks, and robots, such as those formerly from Kiva Systems™, now from Amazon Robotics™, or those available from Fetch Robotics™, may lift racks and move racks to the aperture for access. In other embodiments, an automated warehouse robot, such as one controlled via a trained artificial intelligence algorithm, may move racks or individual computing devices to an aperture in a barrier that otherwise prevents access by humans. Examples include a six or more axis pick and place robot configured to remove rack-mounted computing equipment from racks and place the computing device in the aperture. Other examples include linear robots for vertical storage available from Rollon Solutions™.

Figure 11:
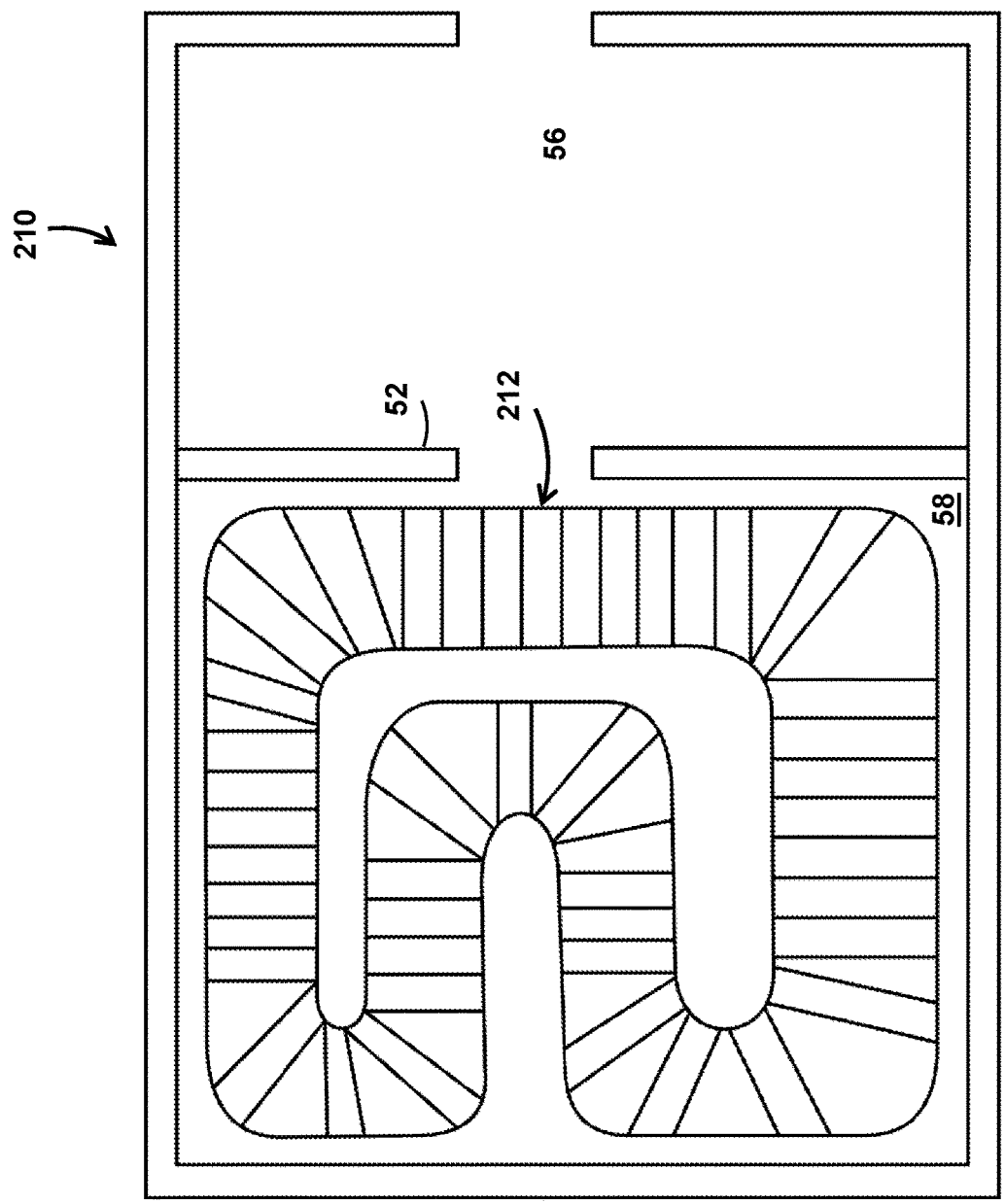
FIG. 11 is another example of a rack enclosure and rack assembly that move relative to one another in accordance with some embodiments of the present techniques.

FIG. 11 shows another example of a compute module 210 having a rack assembly 212 on a serpentine, digitated rail path. In some embodiments, the rack assembly 212 may have racks or vertically mounted computing devices mounted on in an assembly like that used in luggage handling systems at airports. In some embodiments, the rack-mounted computing devices spaced appropriately based on the minimum radius of curvature of the rails to permit such movement. In some embodiments, the rail-mounted system may be advanced to expose a subset of the computing devices through an aperture in the wall 52 in the manner described above.

Figure 12:
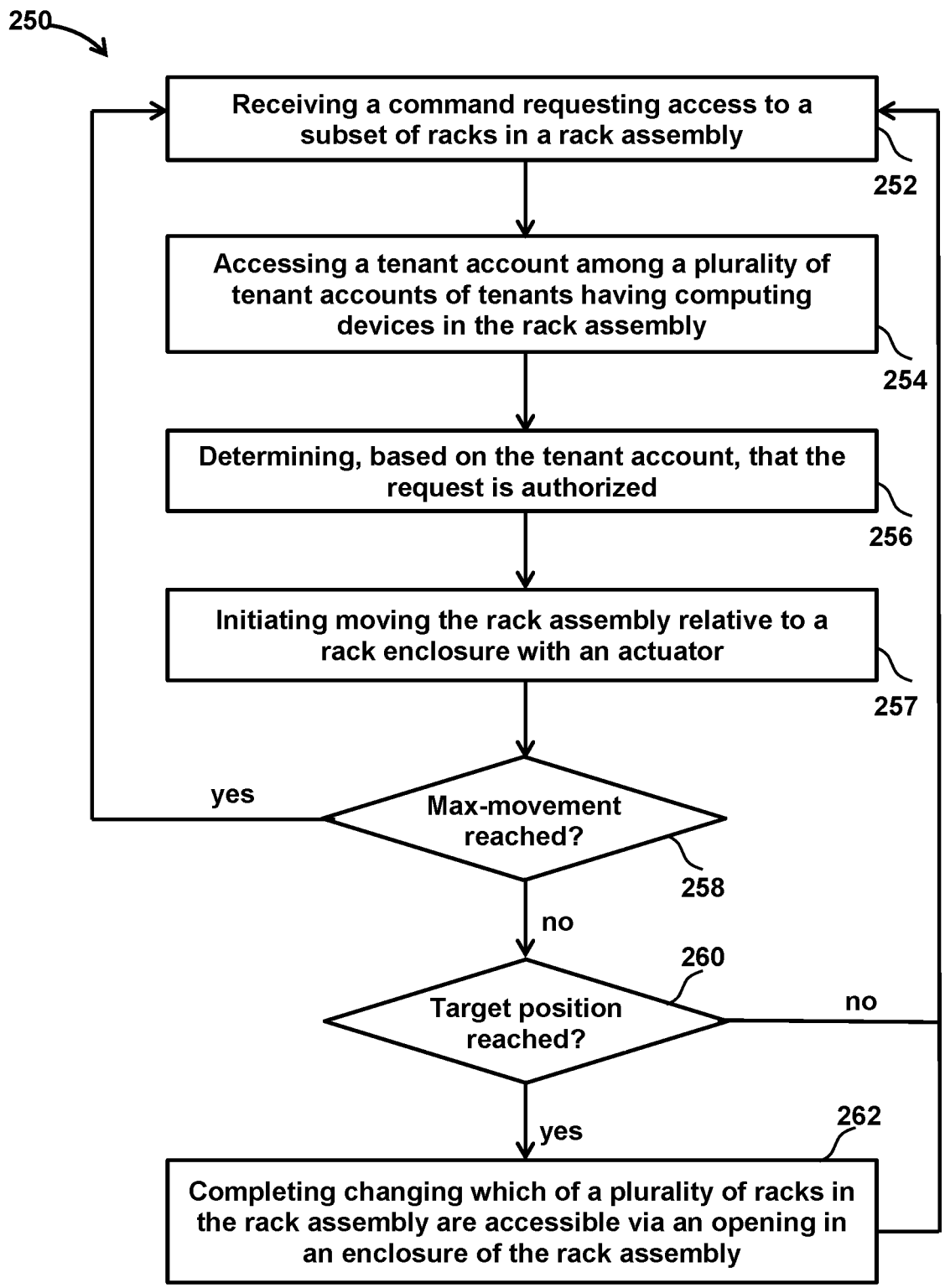
FIG. 12 is a flowchart of a process by which relative movement of a rack in a rack enclosure selectively provides access to a subset of the rack enclosure in accordance with some embodiments of the present techniques.

FIG. 12 is a flowchart showing an example of a process 250 by which relative movement of a rack assembly and a rack enclosure selectively provide access to different portions of the rack assembly. In some embodiments, the process 250 may be implemented with the above-describe systems, though embodiments are not limited to those in arrangements, which is not to suggest that any other description herein is limiting.

In some embodiments, the process 250 begins with receiving a command requesting access to a subset of racks (or rack units) in a rack assembly, as indicated by block 252. Next, some embodiments may access a tenant account among a plurality of tenant accounts of tenants having computing devices in the rack assembly, as indicated by block 254, e.g., based on a credential supplied with the request, like a tenant and employee identifier. Some embodiments may then determine, based on the tenant account, that the request is authorized, as indicated by block 256. Some embodiments may then initiate movement of the rack assembly relative to the rack enclosure with an actuator, as indicated by block 257.

Some embodiments may implement one or more forms of feedback or feedforward control over movement during movement, as illustrated. Some embodiments may determine whether a max-movement has been reached while moving the rack assembly or rack enclosure, as indicated by block 258. In some cases, this may include determining whether the above-described position sensors has sensed the proximity of a flag indicating a maximum movement in one direction or another. Upon detecting that max movement has been reached, some embodiments may cease movement and return to receiving a subsequent command at a later time. Alternatively, some embodiments may continue moving and continue determining whether a target position has been reached, as indicated by block 260. In some embodiments, the target position may be selected based upon the rack to be exposed, and each rack may correspond in a record in memory to an angular displacement from a origin position. The angular displacement of a selected rack may serve as the target position. In some embodiments, the origin position may be determined with reference to one of the max-movement positions, and some embodiments may calibrate the rack assembly by moving the rack assembly until a max movement is reached, for example periodically or at start up. Some embodiments may exercise feedback control of the actuator to reach the target position, such as proportional, proportional integrative, or proportional integrative derivative feedback control based upon a difference between a current position of the rack assembly and the target position until the differences zero. The current position may be determined with an angular displacement sensor (e.g., a rotation counter on the input to the transmission) or feedforward control, e.g., with a stepper motor.

Thus, some embodiments may complete changing which of a plurality of racks in the rack assembly are accessible via an opening in an enclosure of the rack assembly, as indicated by block 262 with the above-described movement.

Figure 13:
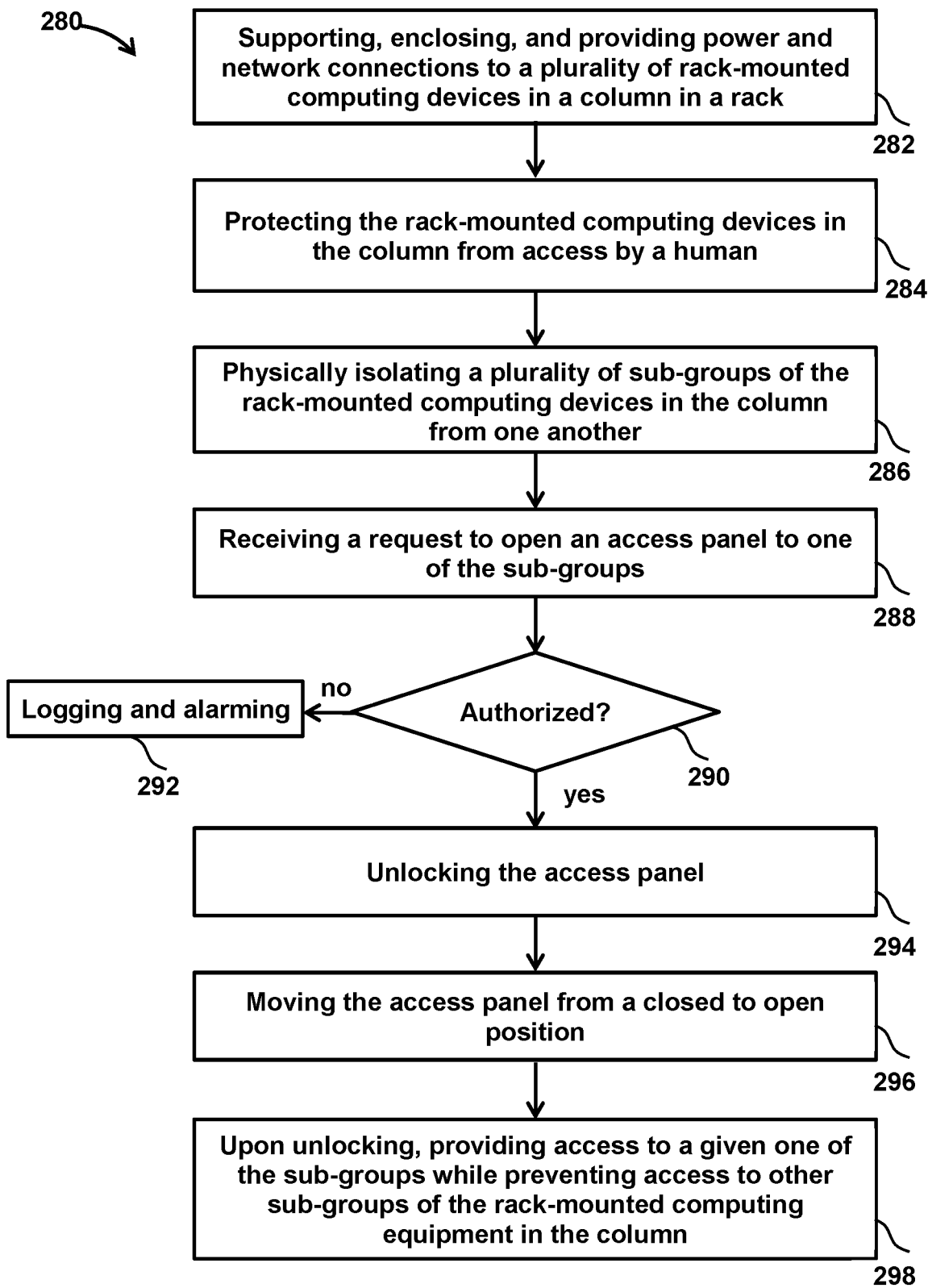
FIG. 13 is a flowchart of a process by which access barriers, such as locker doors, selectively provide access to subsets of computing devices within a given rack in accordance with some embodiments of the present techniques.

FIG. 13 is a flowchart showing an example of a process 280 by which access barriers isolate and selectively provide access to different subsets of rack units in a given rack. In some embodiments, the process 280 may be implemented with the above-describe systems, though embodiments are not limited to those arrangements, which is not to suggest that any other description herein is limiting.

In some embodiments, the process 280 includes supporting, enclosing, and providing power and network connections to a plurality of rack-mounted computing devices in a column in a rack, as indicated by block 282. Embodiments may include protecting the rack-mounted computing devices in the column from access by a human, as indicated by block 284. In some embodiments, protecting may be achieved by positioning the above-described doors in a closed position. Embodiments may include physically isolating a plurality of subgroups of the rack-mounted computing devices in the column from one another, as indicated by block 286. Isolation may be achieved with horizontal metal plates positioned between each of the above-described lockers, in some cases substantially are entirely (or more than 80% or 90% by area) blocking access between each of the above-described volumes behind the locker doors by a human hand.

Some embodiments include receiving a request to open an access panel to one of the sub-groups, as indicated by block 288. The request may be an electronic request, or the request may be received in the form of a technician inserting a key into a lock. Some embodiments may determine whether the request is authorized, as indicated by block 290. Upon determining that the request is not authorized, some embodiments may not permit the access panel to be opened, and some embodiments may log the request and emit an alarm, as indicated by block 292. Alternatively, upon determining that the request is authorized, some embodiments may unlock the access panel, as indicated by block 294.

Some embodiments may include moving the access panel from a closed to open position, as indicated by block 296, and upon unlocking, providing access to a given one of the subgroups while preventing access to the other subgroups of the rack-mounted computing equipment in the column, as indicated by block 298.

Figure 14:
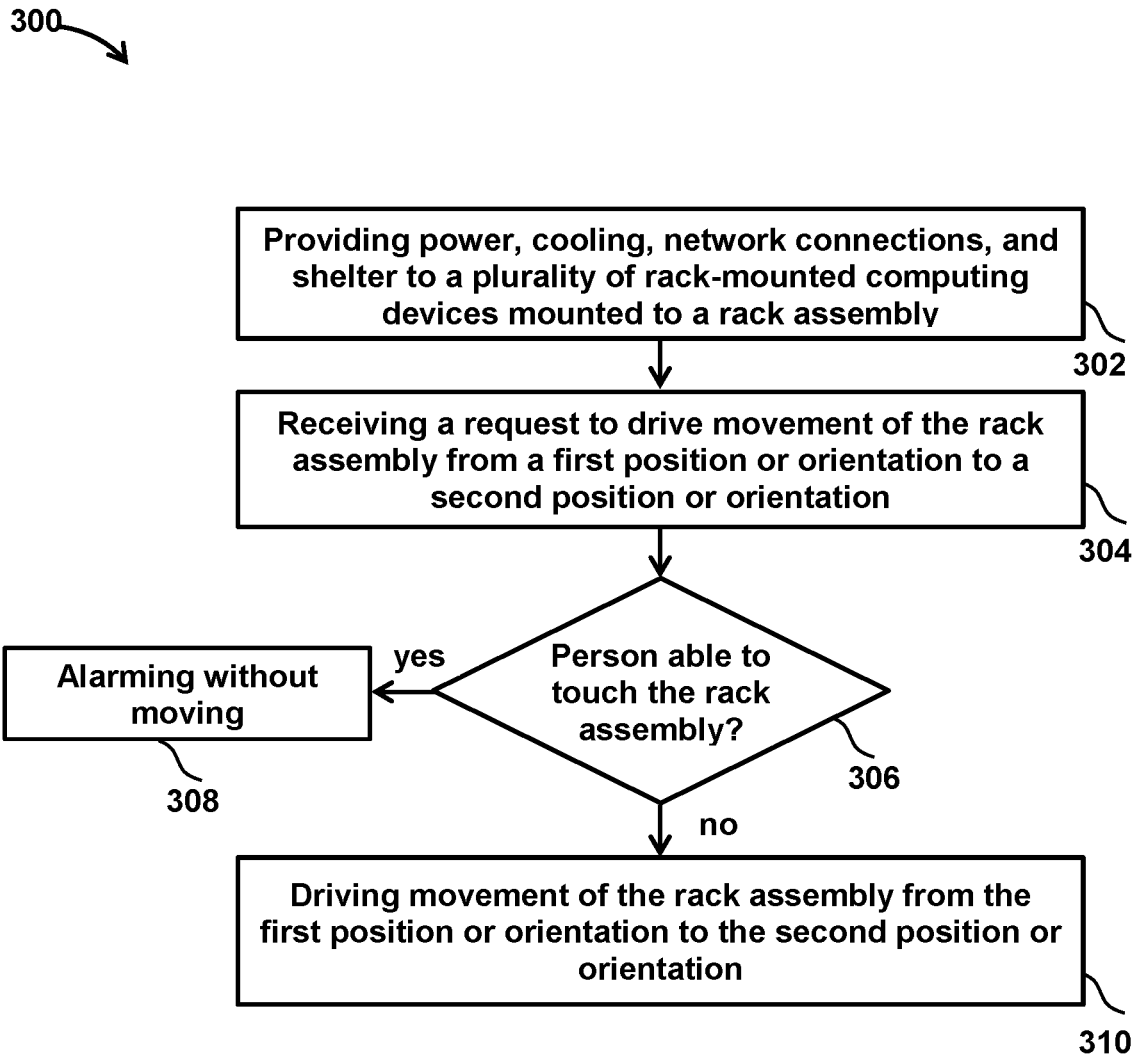
FIG. 14 is a flowchart of a process by which movement of a rack assembly relative to a rack enclosure is selectively actuated responsive to signals indicative of the presence of human beings near the movement.

FIG. 14 is a flowchart showing an example of a process 300 by which signals from safety interlocks may determine whether movement of a rack assembly or rack enclosure occurs. In some embodiments, the process 300 may be implemented with the above-describe systems, though embodiments are not limited to those arrangements, which is not to suggest that any other description herein is limiting.

In some embodiments, the process 300 includes providing power, cooling, network connections, and shelter to a plurality of rack-mounted computing devices mounted to a rack assembly, as indicated by block 302. Some embodiments may include receiving a request to drive movement of the rack assembly from a first position or orientation to a second position or orientation, as indicated by block 304. Some embodiments may determine whether a person is able to touch the rack assembly, as indicated by block 306, for example, based upon signals from one of the above-described safety interlock sensors. Upon determining that the person is able to touch the rack assembly, some embodiments may emit an alarm, such as an audible alarm or display an alarm on a screen and prevent moving, as indicated by block 308. Alternatively, upon determining that a person is not able to touch the rack assembly, some embodiments may drive movement of the rack assembly from the first position or orientation to the second position or orientation, as indicated by block 310. Some embodiments may continue performing the determination of block 306 while driving movement and cease driving movement upon reaching a different result in the determination of block 306.

Figure 15:
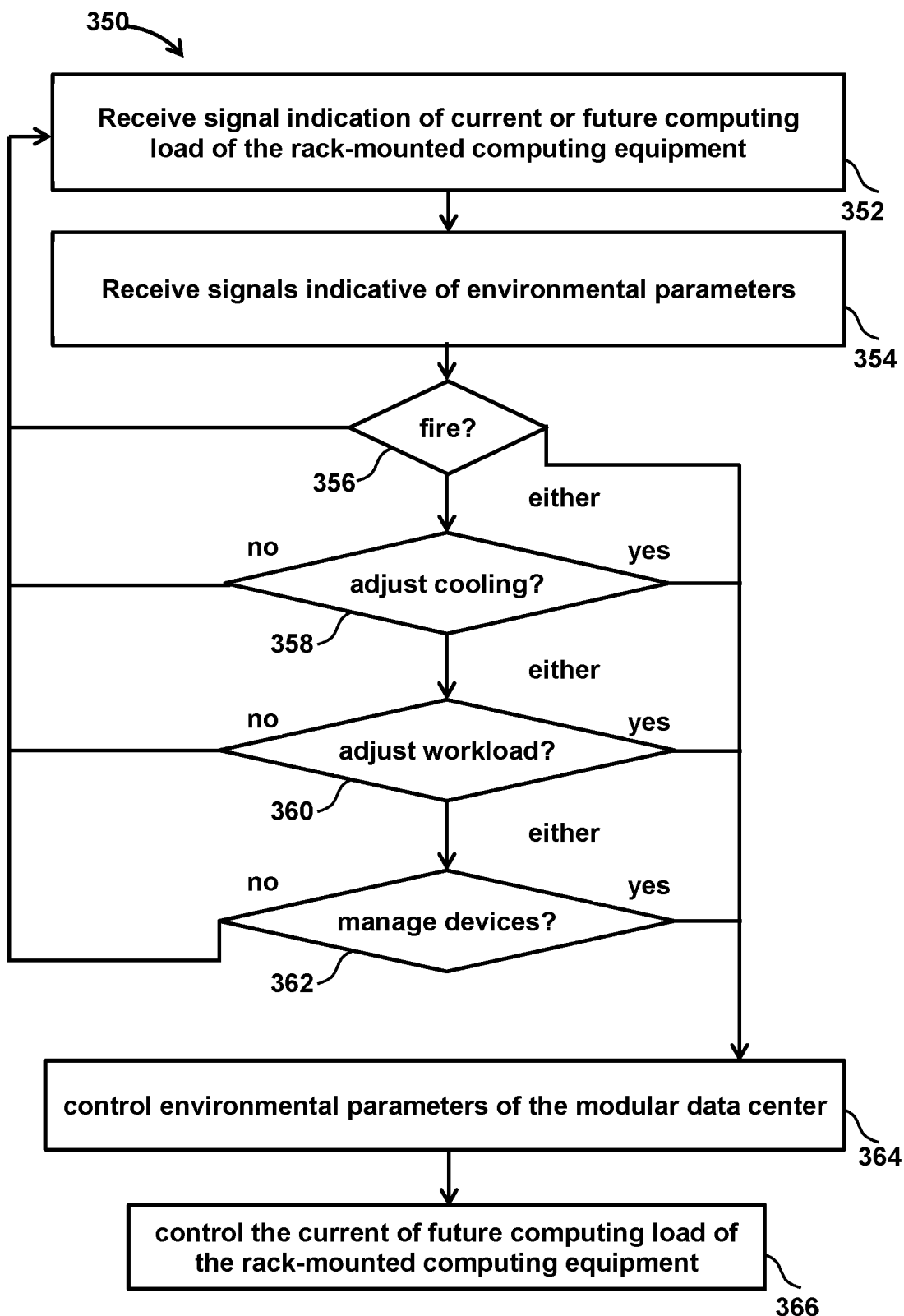
FIG. 15 is a flowchart of a process to control a facility and rack-mounted computing equipment in a modular data center in accordance with some embodiments of the present techniques.

FIG. 15 is a flowchart depicting an embodiment of a process 350 that may be executed by an integrated building and rack management system controller, like the facility controller 168 described above. In some embodiments, the process 350 may control some or all of the environmental parameters of a modular data center at the automated request of infrastructure of the rack assembly within the modular data center. In some embodiments, this may provide relatively fine-ingrained, relatively responsive control over those environmental parameters and the allocation of computing loads within modular data centers.

In some embodiments, the process 350 includes receiving signals indicative of current or future computing load of the rack-mounted computing equipment, as indicated by block 352. In some embodiments, the signal may include a CPU utilization, an amount of memory utilization, a task queue in a task allocation system, or the like.

Some embodiments include receiving signals indicative of environmental parameters of the modular data center, as indicated by block 354. In some embodiments, these environmental parameters include those described in the applications incorporated by reference. Examples include environmental parameters of rack-mounted computing devices, environmental parameters of racks, environmental parameters of rack assemblies, environmental parameters of the modular data center, and environmental parameters of the ambient environment surrounding the modular data center, including current and future predicted weather. In some embodiments, each environmental parameter may be sensed with a respective corresponding sensor, or set of sensors. In some cases the sensors may be coupled to the integrated building and rack management system controller, for example, via an out of band network, such as those described in the applications incorporated by reference. In some cases, these out of band networks may communicate with rack-mounted computing devices via a direct-current data and power bus, for example, via blind mate connectors, like those described in the applications incorporated by reference. Or some embodiments may communicate via an in band network.

Examples of environmental parameters include a cooling fluid flow rate, a cooling fluid temperature before flowing past rack-mounted computing equipment, a cooling fluid temperature after flowing past rack-mounted computing equipment, humidity, temperature, pressure, vibrations, airborne particulates, the presence of person in the modular data center, a person requesting access to the modular data center, a fluid leak, or the presence of a fire.

Responsive to one or more of these signals, some embodiments may determine whether there is a fire, for instance, by comparing a particulate sensor or temperature sensor to a threshold. An example of this determination is depicted in block 56. Upon determining that there is a fire, some embodiments may proceed to control environmental parameters of the modular data center, as indicated by block 364 (control may entail different operations based on the decision block that causes the process flow to reach block 364). In some cases, this may include instructing a blower or fan to cease blowing air, instructing a fire suppression system to release a chemical fire suppressant within the modular data center, instructing apertures between the vestibule and the rack assembly to close, and emitting and logging various alarms.

Some embodiments may further control the current or future computing load of the rack-mounted computing equipment, as indicated by block 366, responsive to the fire determination in block 356. In some cases, this may include shifting a load to another data center, such as another modular data center. Some embodiments may send instructions that cause the load to be shifted to a next closest, for example, by latency to an user computing device, modular data center. In some embodiments, this determination may be made in a distributed fashion, or a centralized task management system may allocate load.

Some embodiments may return to block 352 upon determining that there is no fire and proceed to determining whether to adjust cooling, as indicating by block 358. In some embodiments, this may include determining whether to adjust cooling responsive to a current or future workload, for instance increasing an amount of cooling in advance of an increase in workload currently or within some threshold duration in time. In some embodiments, adjusting cooling may further be made responsive to an indication that the external temperature is increasing, that the internal temperature is increasing, or other changes, for instance, changes in humidity internally or externally. Some embodiments may further adjust other environmental parameters and make a similar determination, for instance, a determination to adjust an amount of humidity, by decreasing or increasing an amount of humidification or dehumidification. Some embodiments may further adjust a type of cooling engaged, for instance, switching between evaporative cooling and refrigeration cycle cooling responsive to an external ambient temperature and humidity, for example, favoring evaporative cooling in higher temperature, lower humidity weather. Thus, upon determining to adjust cooling, some embodiments may proceed to block 364 and control a different respective set of environmental parameters of the modular data center, for example, changing temperature set points, cooling fluid flow rates, humidification, types of cooling, or the like. Some embodiments may further proceed to block 366 and control the current or future computing load of the rack-mounted computing equipment (a term used interchangeably with rack-mounted computing devices), for instance offloading computing tasks to other modular data centers with cooler ambient conditions, less stressed cooling equipment, or the like.

Upon determining not to adjust cooling, some embodiments may return to block 352. In either case, some embodiments may further determine whether to adjust a workload of the edge modular data center, as indicated by block 360. In some cases, this may include determining whether the environmental parameters warrant an adjustment, for example, an amount of cooling is going to be more expensive in a particular modular data center than another one. Some embodiments may determine that an amount of workload relative to an amount of computing resources will cause a greater than threshold amount of response latency and determine to adjust the workload. Some embodiments may determine that the edge modular data center has a capacity for additional workload and send a request to other data centers to have tasks assigned reassigned. Upon determining to adjust the workload, some embodiments may further control environmental parameters of the edge modular data center, as indicated by block 364. In some cases, this may include increasing an amount of heat rejection by increasing cooling fluid flow rate (or decreasing a setpoint temperature) in anticipation of an increase in workload that will generate additional heat. Some embodiments may further control the current or future computing load of the rack-mounted computing equipment as indicated by block 366, for example, with the request to adjust the workload. Upon determining to not adjust the workload, some embodiments may return to block 352.

In either case, some embodiments may determine whether to manage rack-mounted computing devices, as indicated by block 362. In some cases, this may include determining whether a computing device has exceeded the threshold temperature, has exceeded a threshold utilization, has a set of parameters that are out of date, has software that is out of date, or the like. In some cases, this may include performing the operations of the rack controllers described in the applications incorporated by reference. Upon determining to manage the rack-mounted computing devices, which may be done on a device by device basis, some embodiments may control environmental parameters of the modular data center, as indicated by block trick 64. In some embodiments, this may include increasing an amount of cooling fluid flow past a set of rack-mounted computing devices responsive to an individual one of those computing devices having a CPU temperature above a threshold. Some embodiments may further control the current or future computing load of the rack-mounted computing equipment, as indicated by block 366. For example, some embodiments may offload a computing load from one rack-mounted computing device to another rack-mounted computing device while updating application software, an operating system, drivers, firmware, or parameters of a BIOS or UEFI of that rackmounted computing device having its computing load offloaded.

Figure 16:
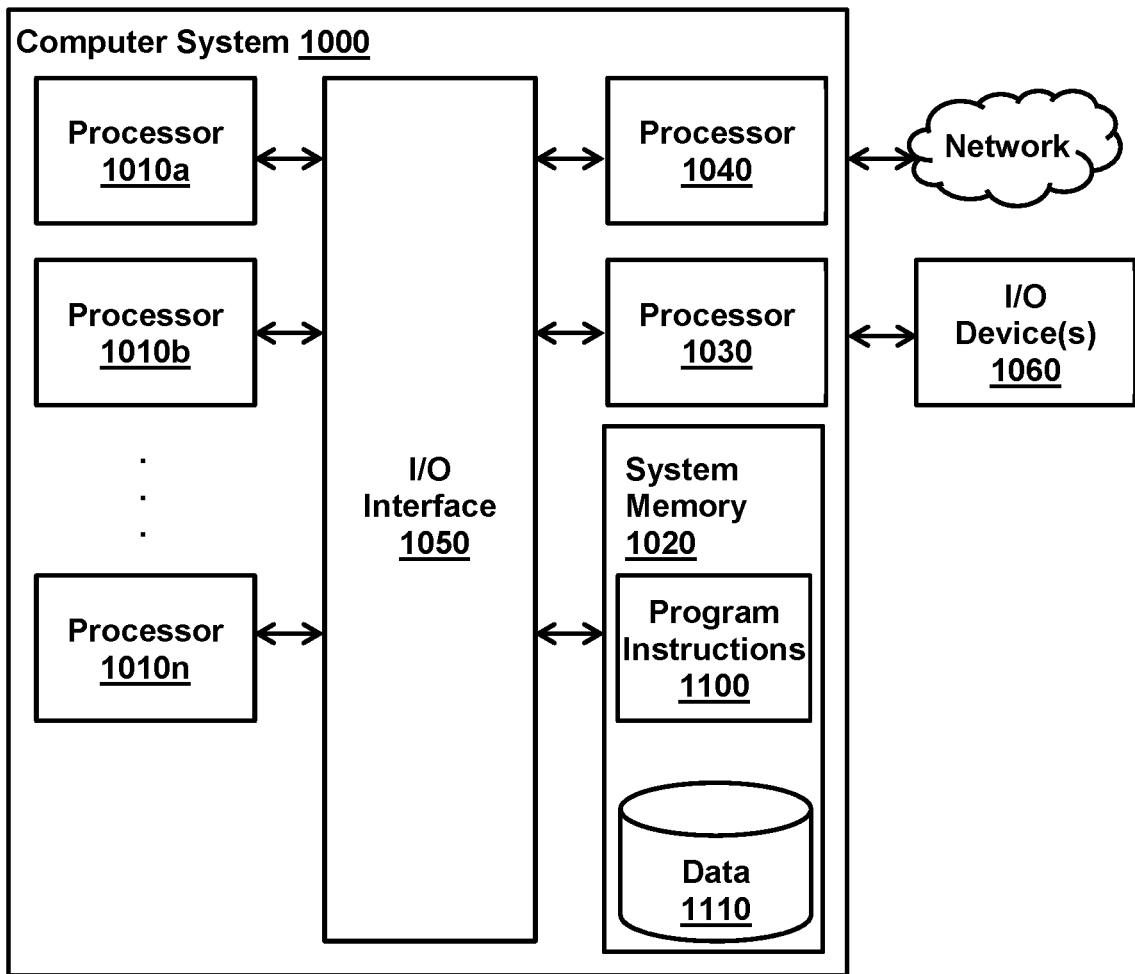
FIG. 16 is an example of a computing device that may be positioned in the racks or may execute the facility controller or remote application that controls the modular data center in accordance with some embodiments of the present techniques.

FIG. 16 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the"

include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments, listed in three groups, with reference to embodiment numbers applying within the respective groups:

Group A:

1. An apparatus, comprising: a rack assembly comprising a plurality of racks coupled to one another, wherein: respective racks among the plurality of racks are configured to hold a plurality of rack-mounted computing devices arrayed in a first direction; the plurality of racks are arrayed in one or more directions orthogonal to the first direction for respective racks, with respective racks positioned side-by-side; a rack-assembly enclosure, wherein: the rack-assembly enclosure is coupled to the rack assembly with: at least one degree of freedom of relative movement between the rack-assembly enclosure and the rack assembly, and fewer than three degrees of freedom of relative movement between the rack-assembly enclosure and the rack assembly; the rack-assembly enclosure comprises a barrier configured to block access to an inaccessible subset of the plurality of racks; the rack-assembly enclosure comprises an opening in the barrier configured to permit access to at least part of an accessible subset of the plurality of racks, the accessible subset and the inaccessible subsets being disjoint sets; the rack assembly and rack-assembly enclosure are configured to determine which of the plurality of racks are in the inaccessible subset and which of the plurality of racks are in the accessible subset responsive to the at least one degree of freedom of relative movement between the rack-assembly enclosure and the rack assembly, such that relative movement of the rack assembly and rack-assembly enclosure selectively provides physical access to a technician to different rack unit portions of the rack assembly; and an actuator mechanically coupled to the rack assembly or the rack-assembly enclosure, the actuator being configured to actuate relative movement between the rack assembly and the rack-assembly enclosure in at least one of the one or more degrees of freedom.
2. The apparatus of embodiment 1, wherein: each respective rack comprises more than four rack units each configured to hold one or more of the rack-mounted computing devices; the rack assembly comprises more than five wedge-shaped racks; the plurality of racks are arrayed in a circular arrangement defining a circular outer perimeter and an interior chamber extending in the first direction; the rack-assembly enclosure comprises one or more walls blocking access to every rack among the plurality of racks in the rack assembly except for those racks aligned with the opening; the opening extends in the first direction at least between a bottom rack unit of the plurality of racks to a top rack unit of the plurality of racks; the opening extends orthogonal to the first direction at least a rack-unit-width of the plurality of racks; the opening extends orthogonal to the first direction less than three rack-unit-widths; the rack-assembly enclosure is coupled to the rack assembly with one and only one degree of freedom of relative movement; and the one and only one degree of freedom of relative movement is rotation about a central axis of rotational symmetry of the rack assembly.
3. The apparatus of any one of embodiments 1-2, comprising: a building that envelopes the rack assembly, wherein: the building comprises first room having a door configured to provide a passage by which a technician walks into the first room; and the rack-assembly enclosure is configured to selectively provides access by the technician in the first room to at least part of the racks in the accessible subset.
4. The apparatus of embodiment 3, wherein: the building is a modular housing configured to be transported on a truck and protect the rack assembly from weather.
5. The apparatus of embodiment 4, comprising: a modular cooling unit coupled to the building and configured to: cool the rack mounted computing equipment by removing heat from a cooling fluid circulated through the rack assembly; and be transported on a truck and coupled to the building at an edge-based data center site having fewer than five rack assemblies in five or fewer truck-transportable modular buildings.
6. The apparatus of embodiment 3, comprising: a solar panel coupled to the building; and power conditioning circuitry coupled to the solar panel and configured to provide power from the solar panel to the rack-mounted computing equipment or environmental controls of the building.
7. The apparatus of any one of embodiments 3-6, comprising: a docking station coupled to the building and configured to dock with a drone and recharge the drone while the drone is docked.
8. The apparatus of any one of embodiments 3-7, wherein: the building comprises a second room separated from the first room by a barrier that defines at least part of the opening.
9. The apparatus of embodiment 8, wherein: walls of the second room define at least part of the rack-assembly enclosure; and the rack assembly blocks the opening and is configured to prevent a person from walking from the first room into the second room through the opening.
10. The apparatus of any one of embodiments 1-9, wherein: the rack assembly has one and only one degree of freedom of movement relative to the rack-assembly enclosure.
11. The apparatus of any one of embodiments 1-10, wherein: the rack assembly is configured to rotate relative to the rack-assembly enclosure while the rack-assembly enclosure remains static.
12. The apparatus of any one of embodiments 1-11, wherein: the rack-assembly enclosure is configured to rotate relative to the rack assembly while the rack assembly remains static.
13. The apparatus of any one of embodiments 1-12, wherein: the rack assembly is configured to both translate and rotate relative to the rack-assembly enclosure to selectively provide access to a selected subset of rack units in a selected rack.
14. The apparatus of any one of embodiments 1-13, wherein: the rack assembly is configured to rotate through more than 90 degrees relative to the rack-assembly enclosure and through less than 720 degrees relative to the rack-assembly enclosure
15. The apparatus of any one of embodiments 1-14, wherein: the rack-assembly enclosure is static and the rack assembly is configured to move relative to the rack assembly-enclosure; and the apparatus comprises: power and data cables coupled to the rack assembly; and a linear or rotational cable carrier in which at least part of the power and data cables are disposed.
16. The apparatus of any one of embodiments 1-15, comprising: a plurality of access barriers mechanically coupled to a given one of the racks, the access barriers being configured to secure and selectively provide access to different respective subsets of rack units in the given one of the racks from access via the opening, wherein: a first access barrier among the plurality of access barriers is configured to secure and selectively provide access to a first subset of the rack units in the given one of the racks; a second access barrier among the plurality of access barriers is configured to secure and selectively provide access to a second subset of the rack units in the given one of the racks; and the second subset of the rack units is disjoint from the first subset of the rack units.
17. A method, comprising: receiving, with one or more processors, a command requesting access to a subset of racks in a rack assembly; accessing, with one or more processors, a tenant account among a plurality of tenant accounts of tenants having computing devices in the rack assembly; determining, with one or more processors, based on the tenant account, that the request is authorized; and in response to the determination, moving the rack assembly relative to a rack enclosure with an actuator and thereby changing which of a plurality of racks in the rack assembly are accessible via an opening in an enclosure of the rack assembly.
18. The method of embodiment 17, wherein: moving the rack assembly relative to the rack enclosure comprises rotating the rack assembly with an induction motor via a reducing transmission.
19. The method of any one of embodiments 17-18, comprising: housing the rack assembly with a modular enclosure configured to be transported on a truck.
20. The method of any one of embodiments 17-19, comprising: executing a plurality of different applications by rack-mounted computing devices mounted in the rack-mounted assembly.

Group B:
1. An apparatus, comprising: a rack, comprising: a plurality of rack units each configured to receive rack-mounted computing equipment; and a plurality of lockers each housing a different respective subset of the rack units, wherein respective lockers among the plurality comprise: a first respective barrier disposed between a respective pair of the rack units, the first respective barrier being permanently affixed to the rack; a second respective barrier disposed between another respective pair of the rack units, the second respective barrier being permanently affixed to the rack; a third respective barrier that is orthogonal to the first barrier and the second barrier, the third respective barrier being moveably or removeably coupled to the rack; a respective volume configured to receive one or more computing devices mounted in rack units between the first respective barrier and the second respective barrier and behind a closed position of the third respective barrier; and a respective lock configured to secure the third respective barrier to the rack in the closed position when in a locked state and permit movement of the third respective barrier when in an unlocked state from the closed position to an open position, thereby providing access to the respective volume.
2. The apparatus of embodiment 1, wherein the third respective barrier is coupled to the rack by a hinge.
3. The apparatus of embodiment 1, wherein the third respective barrier is coupled to the rack by a channel along which the third respective barrier or part of the rack is configured to translate as the third respective barrier moves from the closed position to the open position.
4. The apparatus of any one of embodiments 1-3, comprising means for selectively permitting access barrier doors to open.
5. The apparatus of any one of embodiments 1-4, wherein the third respective barrier is positioned on a front side of the rack and a rear side of the rack is inaccessible to technicians.
6. The apparatus of any one of embodiments 1-5, wherein: the respective lock is an electronic lock having a user interface, and the apparatus comprises a remote computer system configured to determine whether to unlock the electronic lock based on whether a user-supplied credential received via the user interface corresponds to a tenant account authorized to access the respective volume; and memory of the remote computer system stores tenant accounts corresponding to a plurality of different tenants having authority to access different ones of the plurality of lockers.
7. The apparatus of any one of embodiments 1-6, wherein: the rack comprises: a first rail extending through each of the lockers; and a second rail extending through each of the lockers; the first rail and the second rail are configured to cooperate to support respective rack-mounted computing devices in the rack units.
8. The apparatus of any one of embodiments 1-7, wherein: the rack comprises three or more lockers disposed adjacent one another; and each locker comprises two or more rack units.
9. The apparatus of any one of embodiments 1-8, wherein: the second respective barrier of a given locker is a metal plate; and the first respective barrier of an adjacent locker that is adjacent the given locker is the metal plate.
10. The apparatus of any one of embodiments 1-9 wherein: each locker comprises a respective set of network and power connections that are independent of network and power connections of other lockers among the plurality of lockers.
11. The apparatus of embodiment 10, wherein: each locker comprises a respective uninterruptable power supply.
12. The apparatus of any one of embodiments 1-11, wherein each locker comprises a respective self-activating fire-suppression system.
13. The apparatus of any one of embodiments 1-12, wherein each locker comprises a respective rack control unit coupled to an out-of-band network.
14. The apparatus of any one of embodiments 1-13, wherein respective lockers among the plurality of lockers comprise: a respective adjustable or removable fourth barrier defining a rear of the respective volume, wherein the fourth barrier is configurable to modulate an amount of airflow through the respective volume.
15. The apparatus of embodiment 14, wherein the rack comprises a first locker among the plurality configured with a first amount of resistance to cooling fluid flow through the respective volume of the first locker; and a second locker among the plurality configured with a second amount of resistance to cooling fluid flow through the respective volume of the first locker, the second amount being greater than the first amount, wherein the second locker is empty of rack-mounted computing equipment and the first locker comprises rack-mounted computing equipment.
14. The apparatus of any one of embodiments 1-15, wherein the rack is a wedge-rack having a front face that is larger than a rear face and sides that are angled relative to one another such that the sides are closer to together at the rear face than at the front face.
17. The apparatus of embodiment 16, wherein: each locker comprises a pair of wedge-shaped volumes on either side of a portion of the respective volume configured to configured to receive the one or more computing devices.
18. The apparatus of any one of embodiments 1-17, comprising: a chamber comprising a plurality of wedge-shaped racks, including the rack, each having a respective plurality of the lockers.
19. The apparatus of embodiment 18, comprising: a modular building in which the chamber is disposed; an actuator configured to rotate the chamber; and one or more walls that define a first room of the building, a second room of the building, and an opening in the one or more walls between the first room and the second room, wherein: the chamber is positioned to obstruct the opening, such that the opening selectively provides access to different ones of the plurality of wedge-shaped racks based on a position of the chamber controlled by the actuator.
20. The apparatus of any one of embodiments 1-19, comprising: a plurality of computing devices of a plurality of different tenants disposed in the locker, wherein the computing devices are grouped by tenant such that each locker only comprises computing devices of a single respective tenant.

Group C:
1. An apparatus comprising: a housing configured to shield a datacenter from weather, the housing comprising: a first volume; a rack disposed at least partially disposed in the first volume and configured to hold rack-mounted computing devices; an actuator mechanically coupled to the rack and configured to drive movement of the rack and rack-mounted computing devices mounted to the rack, wherein a range of actuator-driven movement of the rack is substantially within the first volume; an access-control vestibule configured to be occupied by a technician servicing the rack-mounted computing equipment and provide access to the rack-mounted computing equipment, the access-control vestibule being accessible via a door of the housing and having an opening by which the first volume is accessible; and a safety interlock configured to selectively prevent the actuator from driving movement of the rack in response to a signal indicative of whether a person in the access-control vestibule could be contacted by movement of the rack.
2. The apparatus of embodiment 1, wherein the housing is a module housing comprising: a first truck-transportable module comprising the first volume and the access-control vestibule; and a second truck-transportable module comprising a heat exchanger configured to reject heat from the rack-mounted computing equipment to an environment external from the housing, the second truck-transportable module being configured to be transported separately from the first truck-transportable module.
3. The apparatus of any one of embodiments 1-2, wherein: the housing comprises one or more walls defining a boundary between the first volume and the access-control vestibule, the first volume and the access-control vestibule each being a right prism.
4. The apparatus of any one of embodiments 1-3, wherein: the housing comprises a plurality of racks, including the rack, arranged in an assembly; the actuator is configured to drive rotation of the assembly about an axis of symmetry of the assembly, the actuator comprising an electric motor and a transmission by which the electric motor is configured to drive rotation of the assembly; the housing comprises thrust bearings configured to transfer a load from a weight of the assembly to the housing; and the first volume comprises a room of the housing in which the assembly of the plurality of racks is configured to rotate.
5. The apparatus of any one of embodiments 1-4, wherein: the safety interlock comprises a light curtain configured to indicate, via the signal, whether a person is adjacent the first volume; and the actuator comprises a controller configured to prevent movement of the actuator responsive to the signal.
6. The apparatus of embodiment 5, wherein: the light curtain is disposed between a terminal support stand in the access-control vestibule and an opening between the access-control vestibule and the first volume.
7. The apparatus of any one of embodiments 1-6, wherein: the safety interlock comprises a weight sensor coupled to a floor of the housing; and the signal is based on whether the weight sensor senses greater than a threshold weight.
8. The apparatus of any one of embodiments 1-7, wherein: the safety interlock is configured to permit movement of the actuator in response to a determination that a person is in a defined location.
9. The apparatus of any one of embodiments 1-8, wherein: the safety interlock is configured to permit movement of the actuator in response to a determination that a person is not in a defined location.
10. The apparatus of any one of embodiments 1-9, wherein the safety interlock comprises: a camera configured to capture images of an interior of the housing; one or more processors; and memory storing instructions that when executed by at least some of the one or more processors effectuate operations comprising: receiving an image from the camera; determining, based on the image, whether a person is in an area of the housing adjacent the first volume; and outputting the signal based on the determination.
11. The apparatus of embodiment 10, wherein: the camera is configured to capture images in an infrared portion of the electromagnetic spectrum.
12. The apparatus of embodiment 10, wherein: the camera is a depth-sensing camera configured to output pixel values indicative of both light intensity and distance from the camera.
13. The apparatus of any one of embodiments 1-12, wherein: the safety interlock comprises an ultrasonic transducer; and the signal is based on whether an object interrupts an ultrasonic beam of the ultrasonic transducer.
14. The apparatus of any one of embodiments 1-13, wherein: the safety interlock comprises a light source and a light sensor; and the signal is based on whether an object interrupts a beam of light between the light source and the light sensor.
15. The apparatus of any one of embodiments 1-14, wherein: the safety interlock comprises; a barrier gate configured to translate between an open state and a closed state, the closed state blocking access from the access-control vestibule to the rack; another actuator configured to drive the barrier gate between the closed state and the open state; and a controller configured to direct the other actuator to drive the barrier gate to the closed state before the rack moves and drive the barrier gate to the open state after the rack stops moving.
16. The apparatus of any one of embodiments 1-15, wherein: the actuator comprises an electric motor; the housing comprises: a current sensor coupled to a current source of the electric motor; and a controller configured to sense that current from the current source has exceeded a threshold indicative of movement of the rack being obstructed and, in response, cause the electric motor to cease driving movement of the rack.
17. A method, comprising: providing power, cooling, network connections, and shelter to a plurality of rack-mounted computing devices mounted to a rack assembly; receiving a request to drive movement of the rack assembly from a first position or orientation to a second position or orientation, wherein: the first position or orientation exposes a first subset of computing devices mounted to the rack assembly for service by a technician; the first position or orientation blocks a second subset of computing devices mounted to the rack assembly from access by a technician; the second position or orientation exposes the second subset of computing devices mounted to the rack assembly for service by a technician; and the second position or orientation blocks the first subset of computing devices mounted to the rack assembly from access by a technician; determining that a person is not in a position to touch the rack assembly; and in response to the determination and the request, driving movement of the rack assembly from the first position or orientation to the second position or orientation.

18. The method of embodiment 17, wherein: the determination is based on steps for determining whether it is safe to actuate movement of a rack assembly.
19. The method of embodiment 17, wherein: the determination is based on a determination that no person is within a housing providing the power, cooling, network connections, and shelter to the rack assembly.
20. The method of embodiment 17, wherein: the first subset of computing devices is associated with a first tenant of a plurality of tenants controlling computing devices mounted to the rack assembly; the second subset of computing devices is associated with a second tenant of the plurality of tenants controlling computing devices mounted to the rack assembly; the method comprises: receiving a credential associated with the request; and determining that the credential indicates the request is an authorized request by the second tenant; driving movement of the rack assembly is performed in response to determining that the credential indicates the request is an authorized request.

Group D:
1D. An apparatus, comprising: a modular datacenter, comprising: a rack configured to hold rack-mounted computing equipment; a heat pump coupled to the modular datacenter and configured to reject waste heat from the rack-mounted computing equipment; an integrated building and rack management system controller comprising one or more processors and memory storing instructions that when executed by at least some of the processors effectuate operations comprising: receiving a first signal indicative of a current or future computing load of the rack-mounted computing equipment; and in response to the first signal, adjusting an amount of work done by the heat pump to reject waste heat; and one or more networks communicatively coupling the integrated building and rack management system controller to the heat pump, wherein the integrated building and rack management system controller is configured to control environmental parameters of the modular data center in response to the current or future computing load of the rack-mounted computing equipment and to control the current or future computing load of the rack-mounted computing equipment in response to at least some of the environmental parameters.
2D. The apparatus of embodiment 1D, comprising: a fire-suppression system configured to suppress fires within the rack-mounted computing equipment and communicatively coupled to the integrated building and rack management system controller, wherein the operations comprise: receiving a second signal from the fire-suppression system indicative of a fire within the modular datacenter; and in response to the second signal, actuating the fire suppression system.
3D. The apparatus of embodiment 2D, comprising: a blower or fan configured to circulate air between the heat pump and the rack-mounted computing equipment, wherein the operations comprise: in response to the second signal, instructing the blower or fan to reduce or stop circulating air between the heat pump and the rack-mounted computing equipment.
4D. The apparatus of embodiment 2D, wherein the operations comprise: sending a request over the Internet to transfer at least a portion of the computing load to another data center in response to the second signal.
5D. The apparatus of any one of embodiments 1-4D, comprising: a blower or fan configured to circulate air between the heat pump and the rack-mounted computing equipment, wherein the operations comprise: in response to the first signal, instructing the blower or fan to increase a flow rate of air circulated between the heat pump and the rack-mounted computing equipment.
6D. The apparatus of any one of embodiments 1-5D, where the one or more networks comprise: an in-band network by which inputs of the computing load are received and outputs of the computing load are sent; and an out-of-band network by which the rack-mounted computing equipment is remotely managed and monitored by the integrated building and rack management system controller, wherein managing includes configuring a Unified Extensible Firmware Interface (UEFI) or Basic Input/Output System (BIOS) setting and monitoring includes sensing a temperature of a central processing unit (CPU) of one of the rack-mounted computing devices.
7D. The apparatus of embodiment 6D, wherein the out-of-band network comprises a direct-current (DC) power network through which both DC power and control signals are distributed to the rack-mounted computing devices, and wherein the rack comprises blind-mate connections between the DC power network and the rack mounted computing devices.
8D. The apparatus of any one of embodiments 1-7D, comprising: a set of sensors configured to measure and report to the integrated building and rack management system controller signals indicative of at least four of the following: cooling fluid flow rate; cooling fluid temperature before flowing past rack-mounted computing equipment; cooling fluid temperature after flowing past rack-mounted computing equipment; humidity; temperature; pressure; vibrations; airborne particulates; the presence of a person in the modular datacenter; a person requesting access to the modular datacenter a fluid leak; and fire.
9D. The apparatus of any one of embodiments 1-8D, comprising: a set of actuators configured to modulate, at the instruction of the integrated building and rack management system controller, at least three of the following parameters of the modular datacenter: an amount of lighting; an amount of humification; an amount of dehumidification; a state of a lock as unlocked or locked; chemical release of a fire suppression system; an amount of cooling; and an amount of airflow.
10D. The apparatus of any one of embodiments 1-9D, comprising: a set of sensors configured to measure and report to the integrated building and rack management system controller signals indicative of each of the following: cooling fluid flow rate; cooling fluid temperature before flowing past rack-mounted computing equipment; cooling fluid temperature after flowing past rack-mounted computing equipment; humidity; temperature; pressure; vibrations; airborne particulates; the presence of a person in the modular datacenter; a person requesting access to the modular datacenter; a fluid leak; and fire; and a set of actuators configured to modulate, at the instruction of the integrated building and rack management system controller, each of the following parameters of the modular datacenter: an amount of lighting; an amount of humification; an amount of dehumidification; a state of a lock as unlocked or locked; chemical release of a fire suppression system; an amount of cooling; and an amount of airflow.

11D. The apparatus of any one of embodiments 1-10D, comprising: an actuator configured to drive movement of the rack relative to the modular data center at the instruction of the integrated building and rack management system controller.

12D. The apparatus of embodiment 11D, wherein the operations comprise: steps for calibrating a position of the rack.

13D. The apparatus of embodiment 11D, wherein the operations comprise: receiving a second signal requesting access to the rack; receiving a third signal indicative of a user requesting access to the rack presenting a security credential demonstrating that the request is authorized; in response to the second and third signals collectively, changing a target state of the actuator to cause the actuator to move the rack from an inaccessible position in the modular data center to an accessible position in the modular data center.

14D. The apparatus of any one of embodiments 1-13D, comprising: means for adjusting an aperture size by which access is selectively granted to the rack.

15D. The apparatus of any one of embodiments 1-14D, the operations comprising: sensing an external ambient temperature of an environment of the modular data center; and causing a workload of the modular datacenter to be adjusted responsive to the external ambient temperature.

16D. The apparatus of any one of embodiments 1-15D, the operations comprising: sensing an external ambient temperature and an external ambient humidity of the modular datacenter shifting a heat rejection load between a refrigeration-cycle cooler and an evaporative cooler responsive to the external ambient temperature and the external ambient humidity of the modular datacenter.

17D. The apparatus of any one of embodiments 1-16D, the operations comprising: changing a lock state of an electronic lock of a locker door by which access is selectively granted to a subset of space to hold the rack-mounted computing devices the rack.

18D. The apparatus of any one of embodiments 1-17D, wherein: the modular data center is configured and sized to be transported on a truck from a factory where the modular data center is assembled to an installation site.

19D. The apparatus of embodiment 18D, comprising: a cellular tower coupled to the modular data center at the installation site.

20D. The apparatus of any one of embodiments 1-19D, comprising: a drone mount on the modular data center; or a solar panel on the modular data center.

What is claimed is:

1. An apparatus, comprising:
a compute housing configured to house computing equipment of an edge modular data center, the compute housing comprising:
an exterior comprising an interface configured to receive one or more types of cooling modules, the exterior and the interface configured to protect an interior of the compute housing from weather;
a first door having an electronic lock;
an access control vestibule accessible via the first door;
a rack assembly enclosure configured to house the computing equipment;
a barrier separating the access control vestibule from the rack assembly enclosure and comprising an aperture or a second door to selectively provide access to the computing equipment housed within the rack assembly enclosure; and
a plurality of lockers, each having a respective lock, and each configured to house at least some of the computing equipment; and
one or more cooling modules coupled to the compute housing via the interface and configured to cool and circulate a cooling fluid into a first region of the rack assembly enclosure, through the lockers, and into a second region of the rack assembly enclosure, wherein:
the one or more cooling modules are attached to the compute housing at an installation site, and
the one or more cooling modules and the compute housing are modular and configured to be interchangeable with other cooling modules or compute housings.

2. The apparatus of claim 1, wherein the one or more cooling modules are configured to provided more than 100 kW of cooling to the compute housing and the compute housing is smaller than 728 square feet.

3. The apparatus of claim 1, wherein the one or more cooling modules are configured to provided more than 100 KW of cooling to the compute housing and the compute housing is smaller than 237.5 square feet.

4. The apparatus of claim 1, wherein:
the computer housing comprises a security interface configured to wirelessly sense that the technician has presented a first security credential and, in response, unlock the electronic lock.

5. The apparatus of claim 1, comprising:
a plurality of the cooling modules attached to the compute housing.

6. The apparatus of claim 1, wherein the racks separate a hotter aisle from a cooler aisle of the rack assembly enclosure.

7. The apparatus of claim 1, wherein at least some of the lockers are arrayed in a two-dimensional matrix.

8. The apparatus of claim 1, wherein at least some of the lockers have different associated uninterruptible power supplies.

9. The apparatus of claim 1, comprising:
a backup power system of the edge modular data center; and
a fire suppression system of the edge modular data center.

10. The apparatus of claim 1, wherein selectively providing access to the computing equipment housed within the rack assembly enclosure from the aperture or the second door comprises:
one or more sensors within the computing housing to detect the presence of a technician; and
providing or denying access to one or more of the locks of respective lockers based in part on an output of the one or more sensors.

11. The apparatus of claim 1, comprising:
means for controlling the edge modular data center.

12. The apparatus of claim 1, wherein:
the compute housing is configured to be transported in pre-assembled form; and
the compute housing is coupled to a cellular tower with which the edge modular data center is colocated.

13. The apparatus of claim 1, wherein:
the compute housing has lateral dimensions smaller than or equal to lateral dimensions of an intermodal shipping container.

14. The apparatus of claim 1, comprising:
the computing equipment disposed in the lockers; and workload applications installed in memory of the computing equipment.

15. The apparatus of claim 1, wherein:
the interface comprises one or more gaskets and an array of apertures;
one or more of the apertures receive a first one of the one or more cooling modules; and
at least a first one of the one or more gaskets seals the first one of the one or more cooling modules against the exterior of the compute housing.

16. The apparatus of claim 1, wherein:
the interface comprises flashing overlapping a portion of the interface to which the one or more cooling modules are coupled to defect water.

17. The apparatus of claim 1, wherein the compute housing further comprises:
one or more sensors configured to detect a presence or location of a technician; and
an actuator configured to provide access to a portion of the plurality of lockers via the aperture or the second door based in part on an output of the one or more sensors.

18. The apparatus of claim 1, wherein:
the aperture or the second door provides access to a lock of a respective one of the lockers housing a selected computing device or a selected subset of computing devices from the computing equipment.

19. The apparatus of claim 18, wherein:
the selected computing device or the selected subset of computing devices corresponds to a tenant, and
the tenant is associated with a credential provided by a technician via the electronic lock of the first door.

20. The apparatus of claim 1, wherein:
the aperture or the second door to selectively provide access to the computing equipment housed within the rack assembly enclosure provides access to at least some of the computing equipment responsive to a first selection of one or more of the lockers corresponding to a first tenant and does not provide access to the at least some of the computing equipment corresponding to the first tenant responsive to a second selection of one or more different ones of the lockers corresponding to a second tenant.

21. The apparatus of claim 1, wherein:
the cooling fluid is a gas or liquid.

22. An apparatus, comprising:
a compute housing configured to house computing equipment of an edge modular data center, the compute housing comprising:
an exterior comprising an interface configured to receive one or more types of cooling modules, the exterior and the interface configured to protect an interior of the compute housing from weather;
a first door having an electronic lock;
an access control vestibule accessible via the first door;
a rack assembly enclosure configured to house the computing equipment;
a barrier separating the access control vestibule from the rack assembly enclosure and comprising an aperture or a second door to selectively provide access to the computing equipment housed within the rack assembly enclosure; and
a plurality of racks, each configured to house at least some of the computing equipment; and
one or more cooling modules coupled to the compute housing via the interface and configured to cool and circulate air into a first region of the rack assembly enclosure, through the lockers, and into a second region of the rack assembly enclosure, wherein:
the one or more cooling modules are attached to the compute housing at an installation site, and
the one or more cooling modules and the compute housing are modular and configured to be interchangeable with other cooling modules or compute housings.

* * * * *